United States Patent
Jarchow et al.

(10) Patent No.: US 6,597,465 B1
(45) Date of Patent: Jul. 22, 2003

(54) AUTOMATIC MODE DETECTION AND CONVERSION SYSTEM FOR PRINTERS AND TAG INTERROGATORS

(75) Inventors: Jaye A. Jarchow, Snohomish, WA (US); Christopher A. Wiklof, Everett, WA (US)

(73) Assignee: Intermec IP Corp., Woodland Hills, CA (US)

( * ) Notice: Subject to any disclaimer, the term of this patent is extended or adjusted under 35 U.S.C. 154(b) by 0 days.

(21) Appl. No.: 09/067,339

(22) Filed: Apr. 27, 1998

Related U.S. Application Data

(63) Continuation-in-part of application No. 08/771,320, filed on Sep. 3, 1996, now abandoned, which is a continuation of application No. 08/288,666, filed on Aug. 9, 1994, now abandoned.

(51) Int. Cl.[7] ............................. G06K 1/00; G06F 15/00
(52) U.S. Cl. ................ 358/1.12; 358/1.15; 235/462.12; 235/462.01
(58) Field of Search ....................... 235/462.15, 462.01; 358/1.12, 1.15

(56) References Cited

U.S. PATENT DOCUMENTS

| | | | | |
|---|---|---|---|---|
| 4,660,221 A | * | 4/1987 | Dlugos ........................ 101/71 |
| 4,889,977 A | * | 12/1989 | Haydon ........................ 235/375 |
| 4,992,957 A | | 2/1991 | Aoyama et al. ............. 364/519 |
| 5,086,504 A | | 2/1992 | Nemeth-Johannes et al. ............................ 395/700 |
| 5,165,014 A | | 11/1992 | Vassar ........................ 395/112 |
| 5,194,720 A | * | 3/1993 | Reinnagel et al. ........... 235/437 |
| 5,222,200 A | | 6/1993 | Callister et al. ............. 395/112 |
| 5,272,544 A | * | 12/1993 | Sakai et al. ................. 358/445 |
| 5,287,434 A | * | 2/1994 | Bain et al. .................. 235/432 |
| 5,324,922 A | * | 6/1994 | Roberts ....................... 235/375 |
| 5,353,338 A | | 10/1994 | Nakano et al. ............... 379/99 |
| 5,388,920 A | | 2/1995 | Ohara ......................... 400/76 |
| 5,392,419 A | | 2/1995 | Walton ....................... 395/500 |
| 5,393,965 A | * | 2/1995 | Bravman et al. ........... 235/383 |
| 5,415,479 A | * | 5/1995 | Kuhn et al. ................. 400/104 |
| 5,427,459 A | | 6/1995 | Makino ....................... 400/76 |
| 5,452,404 A | | 9/1995 | Matsuzaki et al. .......... 395/112 |
| 5,455,895 A | | 10/1995 | Hattori ....................... 395/112 |
| 5,467,432 A | | 11/1995 | Ota ............................ 395/112 |
| 5,544,287 A | | 8/1996 | Roth .......................... 395/114 |
| 5,793,032 A | * | 8/1998 | Bard et al. ............. 235/462.15 |
| 6,283,375 B1 | * | 9/2001 | Wilz et al. ............. 235/462.25 |

FOREIGN PATENT DOCUMENTS

| | | |
|---|---|---|
| JP | 4-189570 | 7/1992 |
| JP | 5131726 | 5/1993 |

* cited by examiner

*Primary Examiner*—Edward Coles
*Assistant Examiner*—Ashanti Ghee
(74) *Attorney, Agent, or Firm*—Seed IP Law Group PLLC

(57) ABSTRACT

An apparatus, such as a printer or reader receives a data stream from a memory, such as from an RF or photonic memory, and compares portions of the data stream to a table of data. If a portion of the data matches an entry in the table, a corresponding entry in the table causes the apparatus to be automatically configured. Alternatively, an apparatus receives a data stream to be written, such as in a bar code symbol or tag memory. The apparatus analyzes portions of the data, comparing portions of the data to a reference table. If the apparatus identifies a match, the apparatus adjusts the writing of such data. For example, the printer writes a portion of the incoming data stream to both fields in a bar code symbol and in a portion of the memory in an adjacent RF readable tag.

12 Claims, 15 Drawing Sheets

| Read Data | Effect |
|---|---|
| Header A | Read/Write Tag |
| Header B | Read Only |
| Address A | Print X Data in Field 1 |
| Address B | Print Y Data in Field 2 |
| ⋮ | ⋮ |
| Frequency A | Tag Residence Time = P |
| Frequency B | Tag Residence Time = Q |

AUTOMATIC MODE DETECTION AND CONVERSION SYSTEM FOR PRINTERS AND TAG INTERROGATORS

CROSS-REFERENCE TO RELATED APPLICATION

This application is a Continuation-In-Part of U.S. patent application Ser. No. 08/771,320, filed Sep. 3, 1996, now abandoned which was a Continuation of U.S. patent application Ser. No. 08/288,666, filed Aug. 9, 1994, now abandoned.

TECHNICAL FIELD

The present invention relates generally to printer and tag interrogator systems and, more particularly to an automatic mode detection and conversion system for controlling the operation of a printer or a tag interrogator.

BACKGROUND OF THE INVENTION

When connected to a computer system, printers are typically controlled by software executing on the computer system. The software sends printer commands, such as start of data, end of data, and the like, and data to the printer, and receives status information from the printer, such as out of paper, paper jammed, and the like. Printer commands tell the printer how the data should be printed. Currently, control codes are used to designate printer commands. A control code is a non-printing character used by a computer program to control the actions of an external device. Aside from printing, control codes are used in other types of communications, including management of display screens.

Computer users typically encounter control codes, also known as setup strings or escape sequences, when dealing with printers. An escape sequence is a sequence of characters, beginning with the Escape character (ASCII 27, hexadecimal 1B), followed by one or more characters that collectively issue an instruction or command to the printer. Often, some type of terminating character is used to designate the end of an escape sequence. The Escape character and terminating characters tell the printer to interpret all characters in between as commands rather than as data. Printer control codes vary by make and model of the printer. Printer control codes are mainly employed by programmers or by users to control a printer when an application program does not support the printer or one of the printer's specialized features.

Requiring users to work with control codes is burdensome because the control codes are often awkward to type, i.e., users are required to depress more than one key at a time, and the control codes are virtually meaningless when printed. For example, novice users find it difficult to remember without reference information the ASCII code representation for a start-of-text control code. When a computer system is being used in the field, that is, outside of an office environment, it is inconvenient to require the users to carry and access such reference information. Additionally, when users create predefined printer commands by storing control codes in a command file, users encounter difficulties because the text editing programs used to create command files have their own protocol for entering control codes. For example, users find it difficult to enter the control code that signifies a new line or carriage return because text editing programs interpret the carriage return as part of textual data.

Printers are used to print a variety of information, including bar code labels. Bar code labels can be used for tracking and providing information about items. For example, inventory items in stores typically bear printed labels providing information such as serial numbers, price, and size. Some such labels include printed bar code symbols, but symbols selected from a variety of symbologies, many of which may be read optically. Such labels contain a very limited amount of information and are not easily updated, typically requiring the label to be reprinted if it is to be modified.

An alternative method of tracking and providing information about devices uses parasitic power memories. Parasitic power memories are commercially available devices having a single input line and a low power memory device, typically used as tags for inventory control and identification. An example of such devices is found in the DS199x series of Touch Memory devices available from Dallas Semiconductor Corporation.

In operation, parasitic power memories are usually read using a special electronic interrogator or reader that physically contacts the parasitic power memory and forms an electrical connection to the parasitic power memory. The reader supplies a 5 V signal to power the parasitic power memory and outputs a coded signal (polling code) to access the parasitic power memory. When the parasitic power memory receives the polling code and the power input, it outputs data serially to the reader or accepts data from the reader. A further discussion of the structure and operation of such devices is found in the Book of DS199x Touch Memory Standards and the release 50 Ways to Touch Memory, each by Dallas Semiconductor and each of which is incorporated herein by reference.

Such memories disadvantageously require the reader to physically contact the memory to provide power, input the polling code and output the data. Also, the reader must be programmed with a priori knowledge of the particular parasitic power memory, such as control information, including the proper polling code and data transfer protocol. There is no simple mechanism for the reader to obtain control information from the memory itself.

Additionally, there are no efficient methods for storing data to the memories. An apparatus typically generates numerous tags. Thereafter, a person must program each tag individually for a given application, such as for a lot of goods. Often, redundant or overhead data is required to be stored in the memory, in addition to the relevant data that the person desires to have stored in the memory.

SUMMARY OF THE INVENTION

The present invention allows users of a computer system to program a printer using a command mode consisting of alphanumeric characters that can be found on a standard keyboard. Command files created using this command mode are easier to create, read, and understand. The present invention maintains compatibility with prior systems by also allowing users to program a printer using conventional control codes. Printer command files originally created using conventional control codes may be updated with alphanumeric characters because the present invention automatically detects and interprets either command mode.

Aspects of the present invention also automatically detect and convert characteristics of data read from tags, or input to be written to tags. In one aspect of the invention, an apparatus such as a printer or reader receives a data stream from a memory, such as from a RF or photonic memory. The apparatus compares portions of the data stream to separately stored data, such as a look-up table of data. If a portion of the data matches an entry in the table, then a corresponding entry in the table causes the apparatus to be automatically configured.

Alternatively, under another aspect of the invention, an apparatus receives a data stream to be written, such as to be written in a bar code symbol or tag memory. The apparatus analyzes portions of the data, such as comparing portions of the data to a reference table. If the apparatus identifies a match in the portion of the data, then the apparatus adjusts the writing of such data. For example, a printer writes a portion of the incoming data stream to both fields in a bar code symbol and in a portion of the memory in an adjacent RF tag.

DETAILED DESCRIPTION OF THE INVENTION

Figure 1:
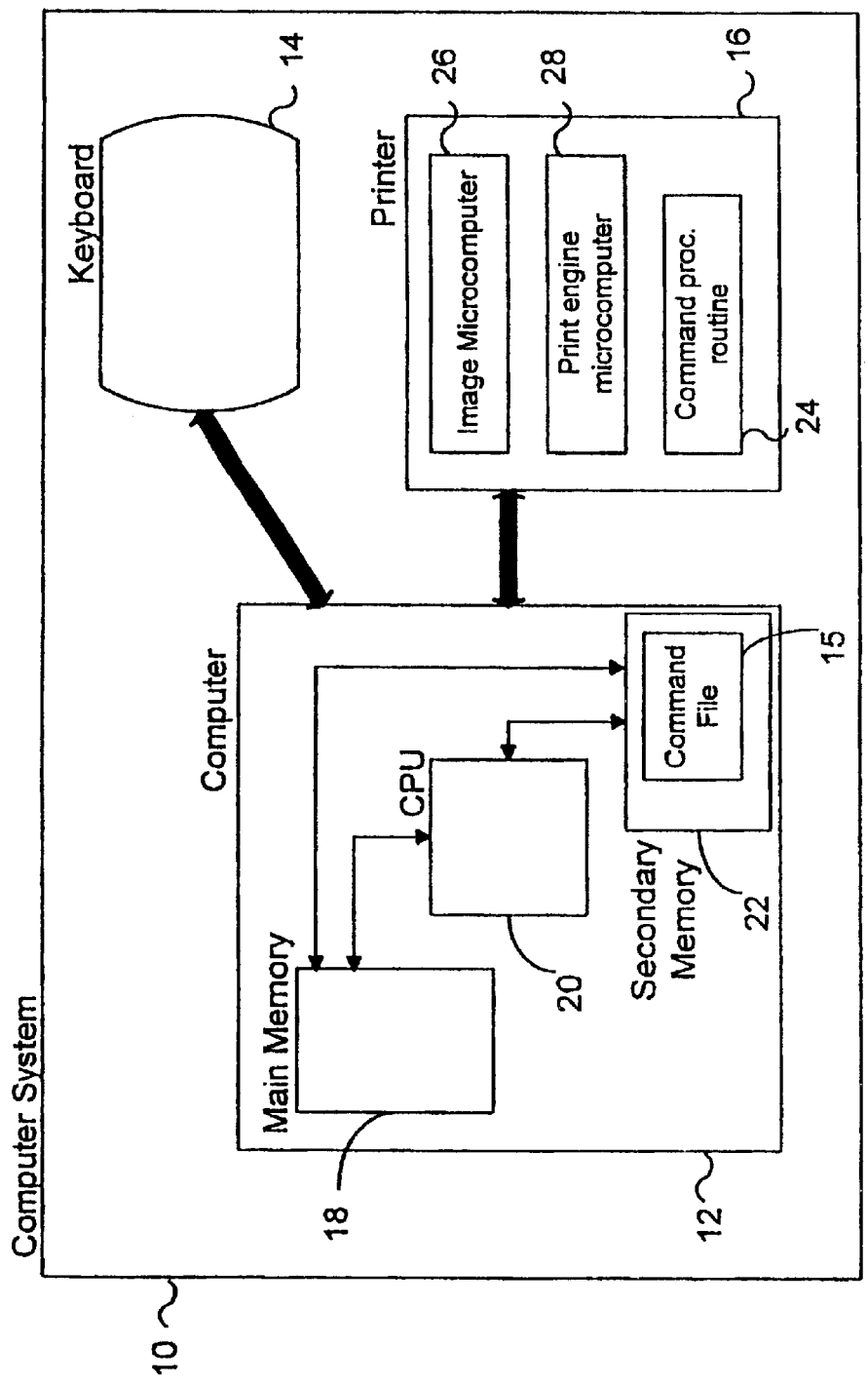
FIG. 1 is an overview block diagram of the software architecture of a computer system configured to implement the method of the present invention, including a keyboard, a computer, a command file stored on the computer, a printer, and a command processing routine.

In a preferred embodiment, the present invention provides an automatic command mode detection and conversion system for controlling a printer. This command mode detection and conversion system allows a user to program a printer using an easy to understand command mode consisting of alphanumeric characters, while maintaining compatibility with conventional printers that require printer commands to be in the form of control codes. FIG. 1 is an overview block diagram of the software architecture of a computer system 10 configured to implement the method of present invention. The computer system 10 includes a computer 12, an input device such as keyboard 14, and an output device such as printer 16. The computer 10 includes a main memory 18, a central processing unit ("CPU") 20, and a secondary memory 22. The printer 16 is a conventional printer in that it includes at least two microcomputers—an image microcomputer 26 and a print engine microcomputer 28. The image microcomputer 26 produces the images which are to be printed on a print medium. The print engine microcomputer 28 is primarily responsible for controlling the movement of the print medium through the printer path.

A command processing routine 24, provided by the present invention, preferably executes on the image microcomputer 26. In an alternate embodiment, the command processing routine 24 could execute on the computer 12. The command processing routine 24 receives input from the keyboard 14 or a command file 15 which is preferably stored in the secondary memory 22. The input may be in either of two command modes. The first command mode uses conventional control codes, also known as setup strings or escape sequences, to designate printer commands. Control codes are non-printing characters, identified only by their ASCII character codes. Example control codes and their ASCII character codes (in hexadecimal) include: Escape, ASCII 1Bh; Back Space, ASCII 8h; Carriage Return, ASCII Dh; and Form Feed, ASCII Eh. Control codes instruct the printer how to print data, for example, when to skip a line, when to bold, when to underline, and so on. Control codes are sent to the printer 16 along with data in the form of messages. A message is a string of characters including a start-of-text character and an end-of-text character.

The second command mode supported by the present invention uses predefined character combinations comprised of alphanumeric characters to represent control codes. In a preferred embodiment of the present invention, a control code is represented in this second command mode as a two or three character mnemonic surrounded by braces. For example, the control code for "Escape" is represented by the alphanumeric characters "<ESC>." Illustrative representations of control codes, their ASCII representation, and preferred mnemonic representations are listed below in

TABLE A

| Control Code | ASCII Char Code (in hex) | Preferred Mnemonic |
| --- | --- | --- |
| null | 0000h | <NUL> |
| start of heading | 0001h | <SOH> |
| start of text | 0002h | <STX> |
| end of text | 0003h | <ETX> |

TABLE A-continued

| Control Code | ASCII Char Code (in hex) | Preferred Mnemonic |
| --- | --- | --- |
| end of transmission | 0004h | <EOT> |
| enquiry | 0005h | <ENQ> |
| acknowledge | 0006h | <ACK> |
| bell | 0007h | <BEL> |
| back space | 0008h | <BS> |
| horizontal tab | 0009h | <HT> |
| line feed | 000Ah | <LF> |
| vertical tab | 000Bh | <VT> |
| form feed | 000Ch | <FF> |
| carriage return | 000Dh | <CR> |
| shift out | 000Eh | <SO> |
| shift in | 000Fh | <SI> |
| data line escape | 0010h | <DLE> |
| device control 1 | 0011h | <DC1> |
| device control 2 | 0012h | <DC2> |
| device control 3 | 0013h | <DC3> |
| device control 4 | 0014h | <DC4> |
| negative acknowledge | 0015h | <NAK> |
| synchronous idle | 0016h | <SYN> |
| end transmission block | 0017h | <ETB> |
| cancel | 0018h | <CAN> |
| end of medium | 0019h | <EM> |
| substitute | 001Ah | <SUB> |
| escape | 001Bh | <ESC> |
| file separator | 001Ch | <FS> |
| group separator | 001Dh | <GS> |
| record separator | 001Eh | <RS> |
| unit separator | 001Fh | <US> |
| delete | 0020h | <DEL> |

Figure 2:
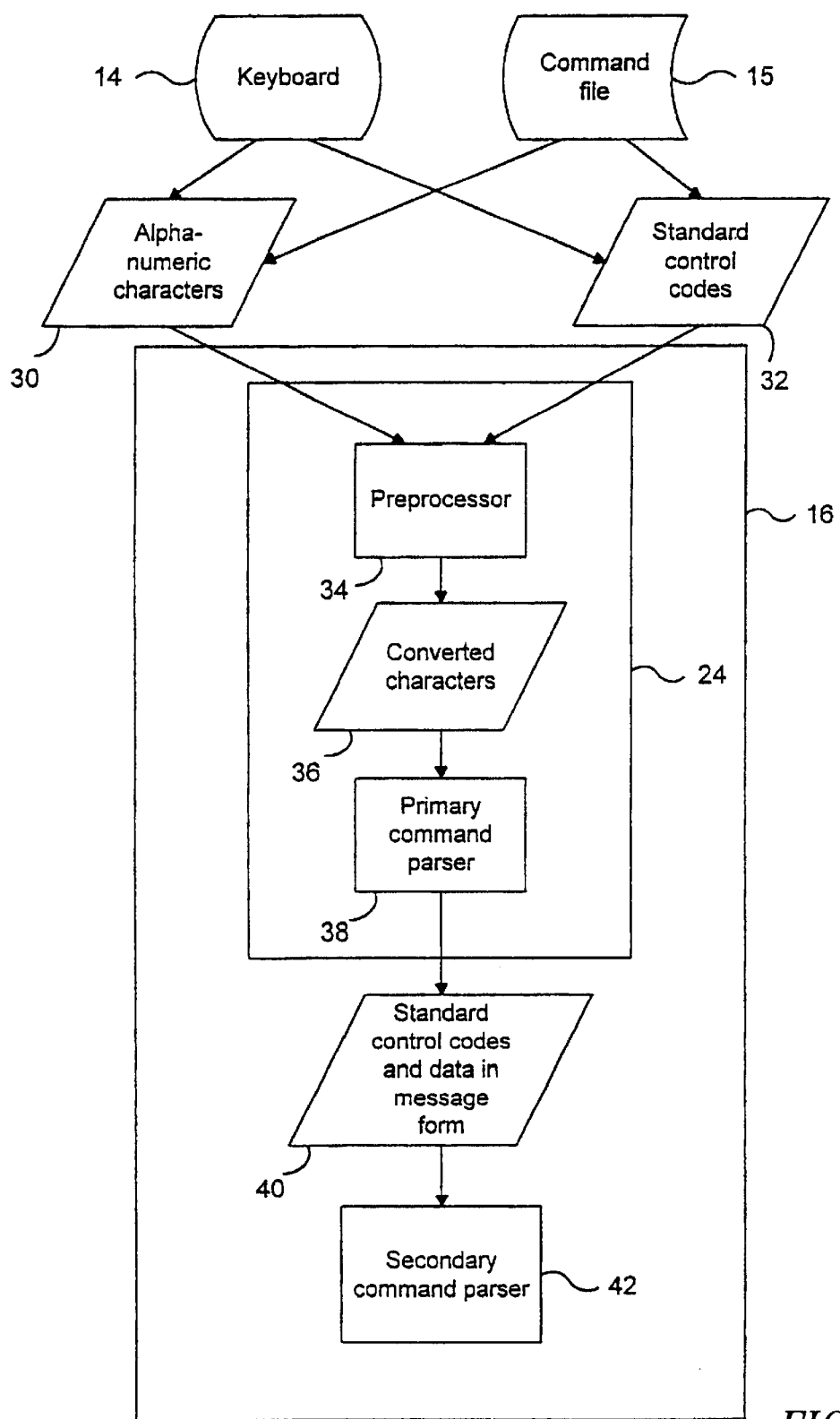
FIG. 2 is a schematic diagram of one-way data flow between the keyboard, the command file, the command processing routine including a preprocessor and a primary command parser, and the printer of FIG. 1.

FIG. 2 is a schematic diagram of one-way data flow between the keyboard 14 and the command file 15, and the printer 16 of FIG. 1. A user inputs characters via the keyboard 14. The characters may be either alphanumeric characters 30 or conventional control codes 32. One or more of these characters may be stored together in the command file 15. The command file 15 is useful when a user or another program frequently requires that documents be printed in a certain format. Then, when the user or the program desires to print a document in that format, the user or the program only has to execute the command file rather than sending all of the commands individually. Application programs such as word processing packages often used command files to control the printing of standard documents.

The command processing routine 24 preferably comprises a preprocessor 34 and a primary command parser 38. The preprocessor 34 receives characters, both the alphanumeric characters 30 and the conventional control codes 32, processes characters to identify the intended command mode, and then converts some or all of the characters to control codes based upon the identified command mode. The command parser 38 receives the processed characters 36, parses the processed characters to determine which are printer commands and which are data that is to be printed, and then sends the printer commands and data 40 to the secondary command parser 42. The secondary command parser 42 causes commands to be executed and/or data to be stored in a buffer.

Figure 3A:
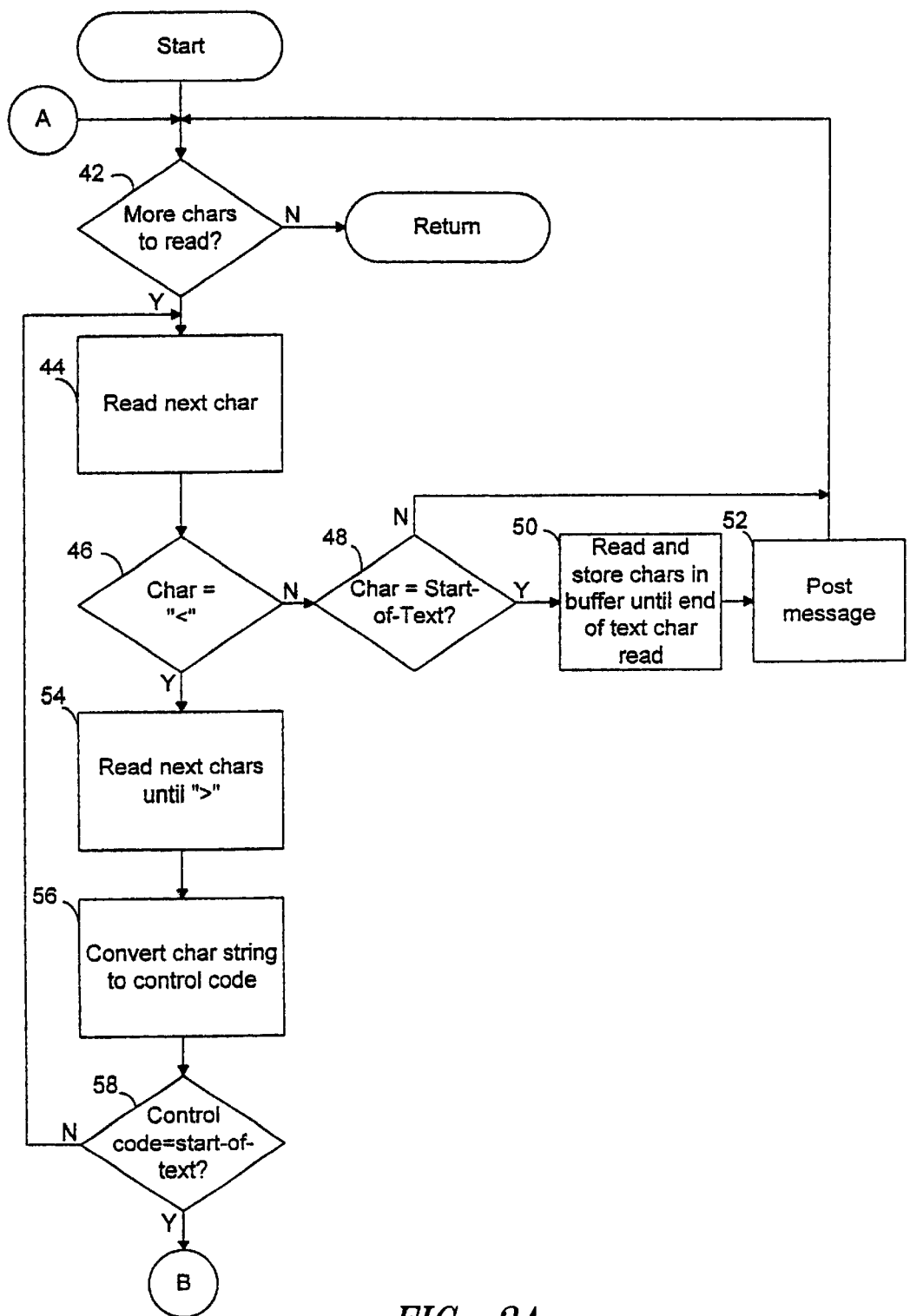
FIGS. 3A and 3B comprise a flow diagram of the method used by the preprocessor to identify the intended command mode in accordance with the present invention.
Figure 3B:
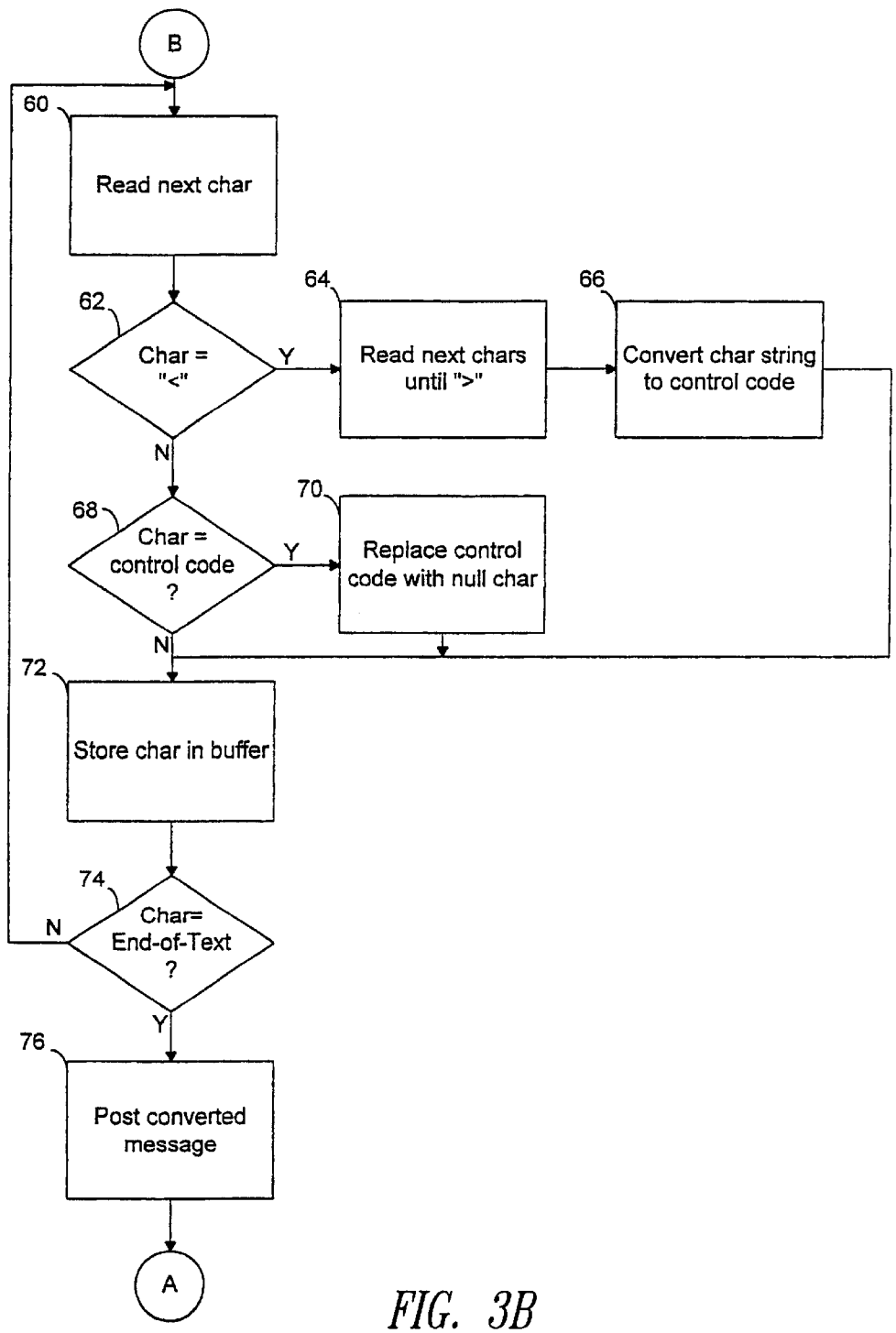

FIGS. 3A and 3B comprise a flow diagram of the method used by the preprocessor 34 to identify a command mode in accordance with the present invention. One or more character strings are input into the preprocessor. In step 42, the preprocessor determines whether any more character strings are available for processing. If there are no more character strings available, then the preprocessor stops processing. If there are character strings available, then, in step 44, the preprocessor accepts a character string as input and reads the next character (starting with the first character) in the accepted character string. As previously noted, the next character may be in an alphanumeric character format or a control code character format. In step 46, the preprocessor determines whether the character is equal to "<". While the "<" character is used in a preferred embodiment of the present invention to designate the beginning of a mnemonic for a control code, those skilled in the art will appreciate that other characters may be used.

If the character is not equal to "<", then, in step 48, the preprocessor 34 determines whether the character is a start-of-text control code. A start-of-text control code has an ASCII representation equal to 2h. If the character is a start-of-text control code, then the preprocessor recognizes that a message is being received and that characters in the message should be processed as conventional control codes. This is described above as the first command mode. In step 50, the preprocessor reads the next characters and stores them in a buffer until an end-of-text control code is read, indicating a complete message has been received. An end-of-text control code has an ASCII representation of 3h. While processing characters according to the first command mode, the preprocessor does not recognize any mnemonics for control codes. Rather, the preprocessor stores the characters that comprise the mnemonic as data in a message. In step 52, the preprocessor posts the message to the secondary command parser 42 within the printer that executes the commands within the message. This secondary command parser 42 must receive commands in the printer's native control code form. The preprocessor then loops back to step 42 to determine whether additional character strings are available for processing.

If the preprocessor 34 determines in step 46 that the character is equal to "<", then, in step 54, the preprocessor reads the next characters until a character equal to ">" is read. The character ">" is used in a preferred embodiment of the present invention to designate the end of a mnemonic for a control code. Those skilled in the art will appreciate that other characters may be used. In step 56, the preprocessor converts the mnemonic to a control code, if such a conversion can be made. That is, the characters are converted to a control code if the characters represent a valid control code. In step 58, the preprocessor determines whether the control code is equal to a start-of-text control code. In a preferred embodiment, and as shown above in Table A, the mnemonic representation for start-of-text is "<STX>." Therefore, if the mnemonic "<STX>" is input, then the preprocessor converts the mnemonic to a start-of-text control code, or ASCII 2h. If the converted control code is not equal to a start-of-text control code, then the beginning of a message has not been received, and the preprocessor loops back to step 44 to read the next character in the string of characters. If the control code is equal to a start-of-text control code, then the preprocessor performs step 60 in FIG. 3B. At this point in time, the preprocessor has determined that the accepted character string is to be processed according to the second command mode. This means that any mnemonics will be interpreted as control codes and any actual control codes will be ignored.

In step 60 of FIG. 3B, the preprocessor 34 reads the next character in the string of characters. In step 62, the preprocessor determines whether the next character is equal to "<". If the next character is equal to "<", then, in step 64, the preprocessor reads the next characters until a character equal to ">" is read. In step 66, the preprocessor converts the mnemonic to a control code, if such a conversion can be made. In step 72, the preprocessor then stores the converted control code in a buffer. If the mnemonic character string cannot be converted, the preprocessor treats the character string like data.

If, in step 62, the preprocessor 34 determines that the character is not equal to "<" then, in step 68, the preprocessor determines whether the character is a control code. If the character is a control code, then in step 70 the preprocessor replaces the control code with a null character. The preprocessor does this because the string of characters currently being processed has been determined to be in the second command mode in which mnemonics are used to represent control codes. In step 74, the preprocessor determines whether the last character read is an end-of-text control code. If not, then the preprocessor loops back to step 60 to read the next character. If the last character read is an end-of-text control code, then, in step 76, the preprocessor posts the converted message and loops back to step 42 of FIG. 3A.

Figure 4:
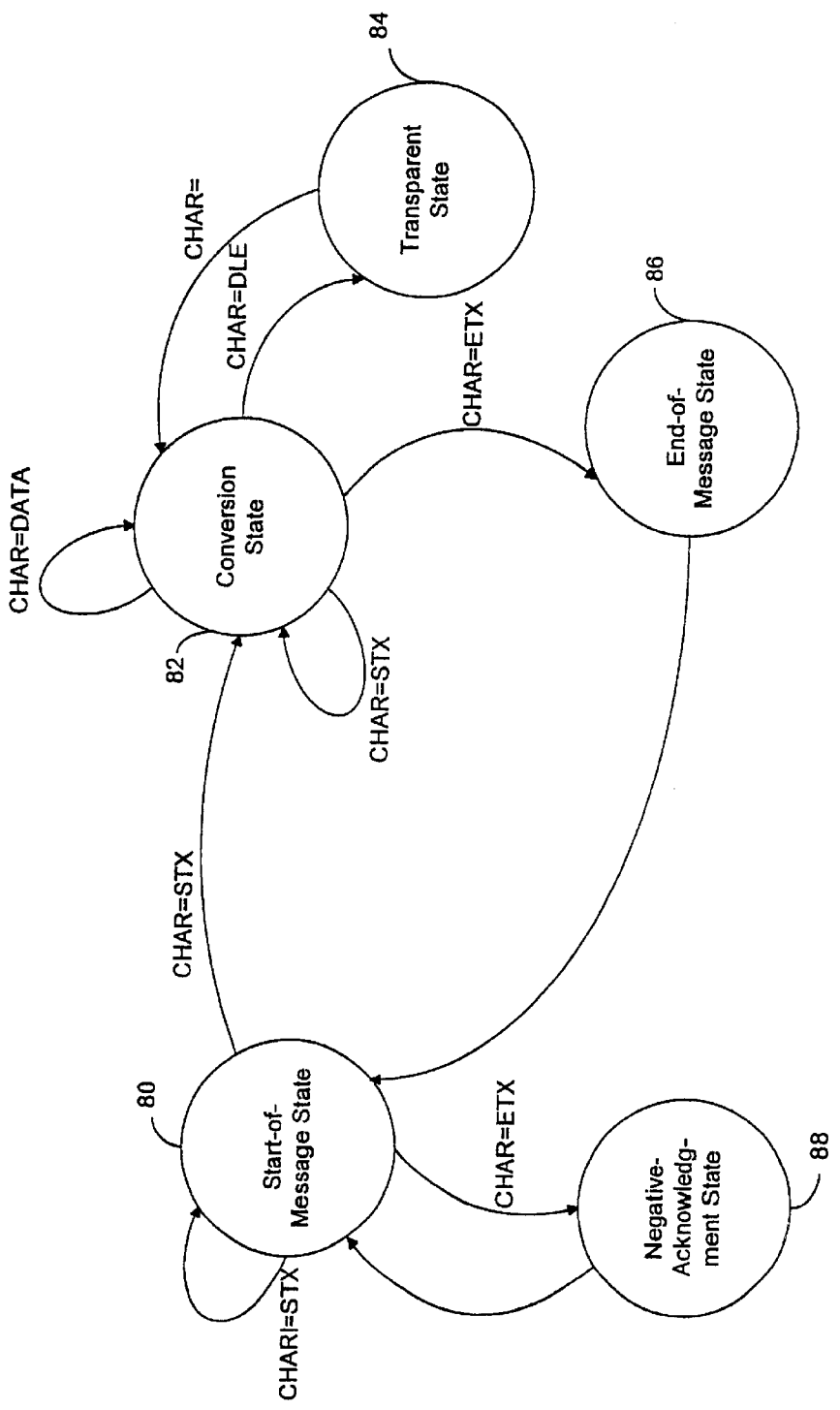
FIG. 4 is a state diagram of the primary command parser of FIG. 2, including a start-of-message state, a conversion state, a transparent state, an end-of-message state, and a negative-acknowledgment state in accordance with the present invention.

FIG. 4 is a state diagram of the primary command parser 38 (see FIG. 2) including a start-of-message state 80, conversion state 82, a transparent state 84, an end-of-message state 86, and a negative-acknowledgment state 88 in accordance with the present invention. The primary command parser 38 receives the converted characters 36 from the preprocessor 34. The primary command parser 38 remains in the start-of-message state 80, waiting for a start-of-text control code. If the primary command processor 38 receives an end-of-text control code while in the start-of-message state 80, the primary command parser 38 proceeds to the negative-acknowledgment state 88. While in the negative-acknowledgment state 88, the primary command parser 38 posts an error code back to the host computer, then returns to the start-of-message state 80.

When the primary command parser 38 receives a start-of-text control code while in the start-of-message state 80, the primary command parser 38 proceeds to the conversion state 82. While in the conversion state 82, the primary command parser 38 ignores all start-of-text control codes. While in the conversion state 82, the primary command parser 38 receives subsequent characters within the message and converts them as necessary, depending on the command mode that was established by that message's start-of-text character. If the primary command processor 82 receives a data link escape control code while in the conversion state 82, the primary command parser 38 proceeds to the transparent state 84. While in the transparent state 84, the command parser 38 accepts any control character or convertible mnemonic as a data character, instead of acting upon it as a command. It stores that character in the buffer and returns to the conversion state. If the primary command parser 38 receives an end-of-text control code while in the conversion state 82, the primary command parser 38 proceeds to the end-of-message state 86. While in the end-of-message state 86, the primary command parser 38 posts the converted message stored in its buffer to the secondary command parser 42, then returns to the start-of-message state 80.

The above-described automatic command mode detection and conversion system enables a user to easily program a printer by alleviating the user's need to know the ASCII representation of a control code in order to control the printer. The user only has to enter a mnemonic for the control code and the present invention will recognize and convert the mnemonic to the appropriate control code. In case a user desires to use the ASCII representation for control codes some of the time, and mnemonics at other times, the above-described automatic command mode detection and conversion system recognizes both types of input on a message-by-message basis. In a preferred embodiment, control codes and mnemonics are not mixed within a message. Commands may be conveyed within a message as either control codes or mnemonics, not both. However, message types, i.e., control code messages or mnemonic string messages, may be sent in any combination from the host computer to the printer. This invention automatically detects the mode of the message, based on its start-of-text character, and converts commands within that message as required. For example, Message 1 shown below contains control code commands, while Message 2 is the same message containing mnemonics for control codes. Both types of messages may be inter-mixed when sent to the printer.

Message 1: 02h 1Bh E1 00h ABCDEFG 23h 03h

Message 2: <STX><ESC>E1<NUL>ABCDEFG<ETB><ETX>

By recognizing both types of input, compatibility with prior art systems is maintained.

Figure 5:
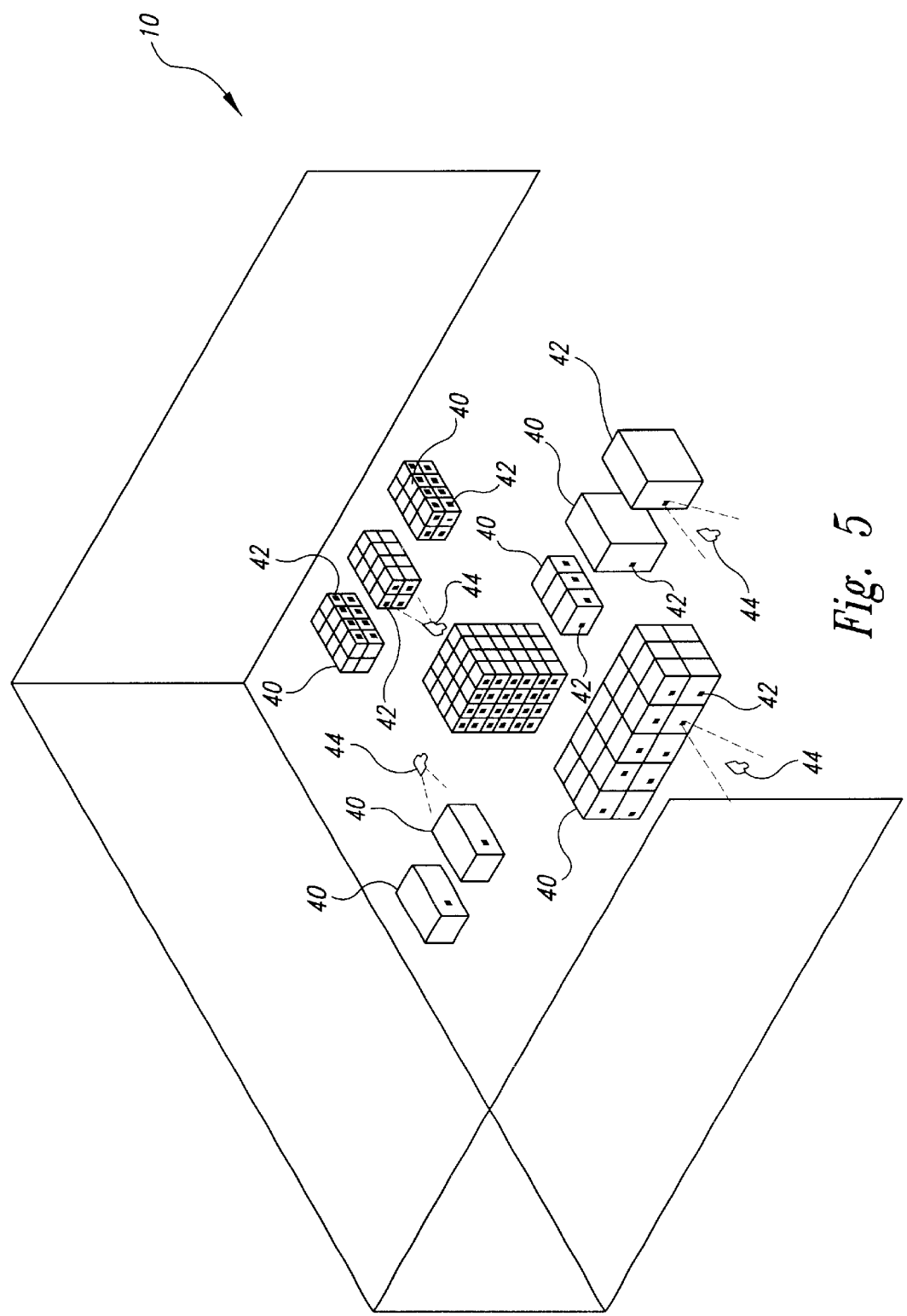
FIG. 5 is an isometric view of a facility containing target objects bearing memory tags.

The above embodiment is applicable to use with RF tags. Referring to FIG. 5, a facility 10 contains several target objects 40. Each of the target objects 40 may be one of a number of types of items, such as items of inventory in a warehouse or container, automobiles in a shipping yard, books in a library, packages in a courier system or any of a wide range of other items. Each of the target objects 40 bears a memory tag 42 which identifies the target object and provides other information about the target object. Information is transmitted to and from the memory tags 42 by hand-held tag readers 44 which communicate with the memory tags 42. In a first exemplary embodiment, the memory tags 42 are optically actuable photonic tags 42, being responsive to a modulated optical signal or beam. In a second exemplary embodiment, the memory tags 42 are RF tags, being responsive to a modulated RF signal or beam. The structure and operation of the memory tags 42 with respect to the first exemplary embodiment will be described first.

Figure 6:
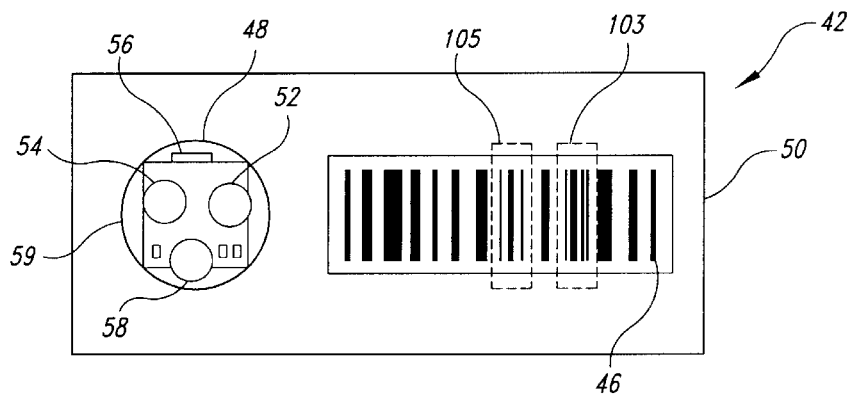
FIG. 6 is a top plan view of a photonic tag incorporating an optically readable symbology and an optically readable and writable memory device.

A preferred embodiment of one of the memory tags 42 is shown in FIG. 6 as a memory tag 42 having two primary components, a symbol 46 and a photonic memory 48, both carried by a substrate 50. The substrate 50 is a substantially planar platform upon which the symbol 46 is printed and to which the photonic memory 48 is attached. The substrate 50 is adapted for repeatable attachment and detachment to various target objects 40 using known attachment means, such as Velcro™, so that the photonic tags 42 are reusable. As seen in FIG. 5, the photonic tags 42 are attached to a visible surface of the target objects 40 so that they may communicate optically with the readers 44.

The symbol 46 is a pattern of regions of varying reflectance on an exposed portion of the substrate 50 that reflects some of the light from an illumination source back toward one of the readers 44. Numerous types of symbologies are known and may include bar codes such as UPC, EAN, Code 39 and Code 93, "multi-row" or "stacked" symbologies such as PDF-417 and Code 49, and "area" symbologies such as Code 1. A bar code is the symbol 46 illustrated in FIG. 6.

Figure 7:
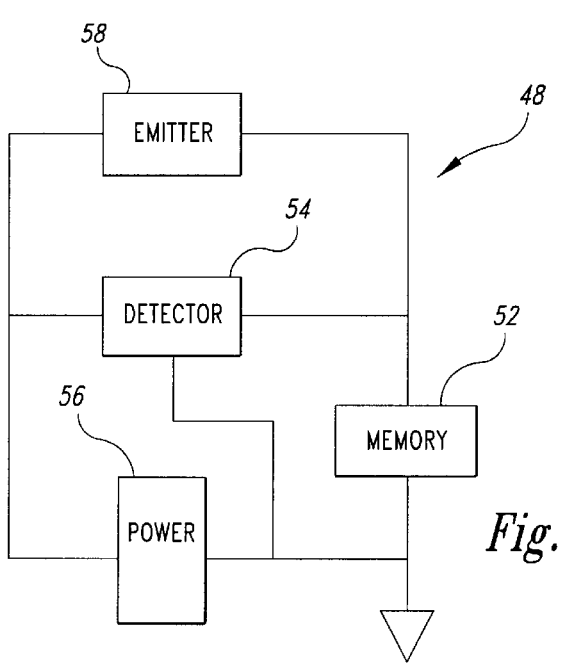
FIG. 7 is a block diagram of a photonic memory of the photonic tag of FIG. 6.

The photonic memory 48 is an optically readable and writable memory device positioned adjacent the symbol 46 on the substrate 50 and is presented in block diagram form in FIG. 7. The photonic memory 48 includes a memory device 52 having its housing grounded, an optical detector 54, a power source 56, and an optical emitter 58. The memory device 52 is a serially readable, single-wire memory device, such as one of the DS199x series of Touch Memory™ devices from Dallas Semiconductor. Such devices have a single terminal used for data input and data output, as well as power input. The housing of the memory device 52 is grounded to provide a signal reference. A microprocessor (not shown) within the memory device 52 controls data transfer and electrical operation of the memory device 52 in a manner known in the art using a manufacturer-identified protocol.

The optical detector 54 is positioned (see FIG. 6) to receive light from a source external to the photonic memory 48 and is connected to provide input to the memory device 52 through an input terminal. The optical emitter 58 is oriented to emit light outwardly from the photonic memory 48 and is connected to be controlled by the memory device 52 to provide an optical output of the photonic memory 48. The power source 56 is a battery connected to provide power to the memory device 52, the optical detector 54, and the optical emitter 58.

While the preferred embodiment employs a battery as the power source 56, other types of power sources are within the scope of the invention. For example, solar cells may be used where an expected lifetime of the battery 56 is inadequate. The relatively large area of the symbol 46 and the generally planar structure of the substrate 50 allow the solar cell to be integrated easily into the photonic tag 42. While such solar cells would typically draw power from ambient light or sunlight, in low light environments the solar cell can convert light energy supplied by the reader 44 into electrical power for the photonic memory 48.

Figure 8:
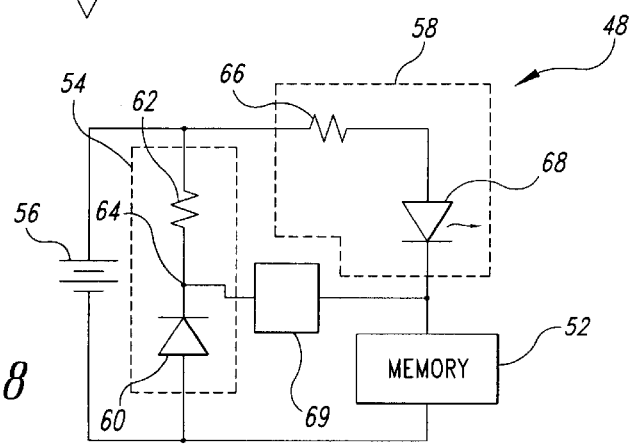
FIG. 8 is a simplified circuit structure of the photonic memory of FIG. 7.

FIG. 8 shows one circuit for realizing the photonic memory 48 of FIG. 7, where the optical detector 54 is formed by a combination of a photodiode 60 and a biasing resistor 62 serially coupled between the terminals of the power source 56. The memory device 52 is connected in parallel to the photodiode 60 through an isolation element 69 at a node 64 and thus receives power from the power source 56 through the biasing resistor 62. Because the photodiode 60 is reverse-biased, current is blocked from flowing through the serially coupled photodiode 60 and biasing resistor 62. Because the memory device 52 does not draw significant current, except when activated, the current through the biasing resistor 62 will be negligible and the voltage at the node 64 will be substantially equal to the voltage of the power source 56.

As is known, in response to an optical signal, the reverse-biased photodiode 60 will draw current causing current to flow through the biasing resistor 62. The voltage at the node 64 will fall in response to the current-induced voltage drop across the biasing resistor 62 producing an electrical signal for input to the memory device 52 on its input terminal through the isolation element 69. If the optical signal is modulated, the electrical signal supplied to the memory device 52 will be correspondingly modulated. By selecting the modulation of the optical signal appropriately, the electrical signal supplied to the memory 52 can be modulated to produce a proper polling signal (i.e., a digital code recognizable by the memory device 52). In response to the proper polling code, the memory device 52 is activated and can be read or programmed according to the protocol specified by the manufacturer.

In the first exemplary embodiment, data transmission from the photonic memory 48 for reading by the reader 44 is realized through optical transmission using the optical emitter 58. The emitter 58 includes a current limiting resistor 66 and a light emitting diode (LED) 68 coupled in series between the positive terminal of the power source 56 and the input terminal of the memory device 52. To output an optical signal, the memory device 52 draws current from the power source 56 through the resistor 66 and the LED 68. In response to the current flowing through it, the LED 68 emits light which is modulated according to the modulation of the electrical signal produced by the memory device 52. When no optical output is desired, the memory device 52 draws substantially no current and the LED 68 emits no light. The isolation element 69 prevents the photodiode 60 from drawing current through the LED 68 and limiting resistor 66.

As described above, communication to and from the photonic tag 42 is realized with the reader 44. The structure and operation of the reader 44 will now be described with reference to FIG. 9. The reader 44 is a portable hand-held device having a head 70 with a reading face 71 and a handle 72 with a trigger 73. The reader 44 advantageously both reads from and writes to the photonic memory 48 through a window 75 mounted at the reading face 71 so that the user does not have to move the reader 44 to perform both the reading and writing functions. Reading of the symbol 46 will be described first.

To read data from the photonic tag 42, a user orients the reader 44 with the reading face 71 thereof facing the photonic tag 42. The user then actuates the trigger 73 to initiate reading. The reader 44 reads the symbol 46 in a conventional manner by illuminating the symbol with a scanning beam, shown by the broken line arrows 77 and detecting the reflected pattern of light energy from the symbol.

The reader 44 produces the scanning beam with a laser diode 74 and a scanning mirror 76, scanned by a scanning motor 78 mounted to a platform 80 located within the head 70 behind the window 75. The laser diode. 74 is oriented to emit a beam of light toward the scanning mirror 76. The scanning motor 78 pivots the scanning mirror 76 through a selected angular range such that when the light from the laser diode 74 strikes the scanning mirror, the light is swept through a corresponding angular range, forming the scanning beam. The structure and operation of such combinations for producing scanning beams is known in the art.

As the scanning beam exits the reader 44 through the window 75, it travels to the target one of the photonic tags 42, and strikes the symbol 46. Because the symbol 46 is a pattern of varying reflectances, some of the light is reflected back to the reader 44 in a pattern corresponding to the pattern of the symbol 46. The light reflected from the symbol 46 enters the head 70 through the window 75 and strikes a gathering mirror 84 which gathers the reflected light and redirects it toward a photodetector 86. The light redirected by the gathering mirror 84 is focused on the photodetector 86 by a lens 88 positioned between the gathering mirror and the detector. To reduce the sensitivity of the photodetector 86 to ambient light, a wavelength selective optical filter 90 is placed between the lens 88 and the photodetector 86.

The photodetector 86 converts the reflected light into an electrical signal which is communicated through a cable 92 to a printed circuit board 94 carrying a microprocessor 96. The microprocessor 96 receives the electrical signal from the photodetector 86 and decodes the electrical signal to identify the information represented by the symbol 46.

The data represented by the symbol 46 includes a data sequence indicating to the microprocessor 96 that the photonic tag 42 includes the photonic memory 48. The reader 44, upon reading and decoding the symbol 46 to determine that the photonic tag 42 includes the photonic memory 48 reads the photonic memory 48 as follows.

The microprocessor 96 first halts the scanning motor 78 by sending a halt signal to the scanning motor 78 through a cable 98. In response to the halt signal, the scanning motor 78 stops scanning the scanning mirror 76 with the scanning mirror held in a predetermined orientation. The beam is thus held stationary and can be aligned to the photonic memory 48 by a user adjusting the position and orientation of the reader 44. The stationary beam will be referred to as the communication beam to distinguish it from the scanning beam. After disabling the scanning motor 78, the microprocessor 96 modulates the drive current of the laser diode 74 through the cable 98 causing the laser diode 74 to emit a modulated optical signal. The optical detector 54 receives the modulated optical signal and, in response to the modulated optical signal, produces an electrical signal for input to the memory device 52.

In typical applications, the scanning beam is confined to a narrow cross section as a collimated or focused beam of light. Because the cross section of the scanning beam is small, the communication beam, if unaltered, would also be of small cross section, making it difficult to maintain alignment of the communication beam with the optical detector 54. To aid the user in maintaining alignment of the communication beam with the optical detector 54, the communication beam is broadened using a broadening lens 99 mounted on the window 75. To minimize the effect of the broadening lens 99 on the scanning beam, the broadening lens is placed at the edge of the angular range of the scan. The predetermined location at which the scanning mirror 76 is halted is selected to be at the angular extreme of the mirror's scan, such that the light from the laser diode 74 passes through the broadening lens 99 when the scanning mirror 76 is stationary.

To initiate reading and writing of data, the memory device 52 requires specified data sequences, referred to herein as polling codes. If the data sequence is not a polling code, the memory device 52 will not accept data or commands and will not output data. Initially, therefore, the modulated optical signal from the laser diode 74 corresponds to one of the polling codes.

Figure 10:
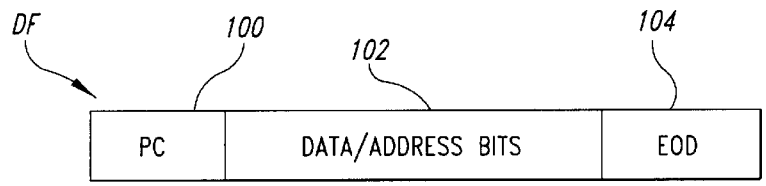
FIG. 10 is a data structure for data transmitted according to the protocol of the photonic tag.

If the memory device 52 receives the polling code corresponding to accepting data, the memory device 52 will accept data. A simple data structure for transmitting data to the memory device 52 is shown in FIG. 10 where the data field DF includes an initial sequence of data bits 100 indicating the polling code PC, a sequence of data and address bits 102 and a sequence of bits 104 representing the end of data EOD.

Because the sequence of data bits 100 representing the polling code may differ for various types of memory devices 52, the symbol 46 advantageously includes a first portion 103 (see FIG. 6) indicating the appropriate polling code for its respective memory device. A second portion 105 (see FIG. 6) of the symbol 46 represents a number ranging from 1 to 8 with each of the numbers 1 through 8 indicating a different device type or data protocol. When the microprocessor 96 decodes the symbol 46, the microprocessor first decodes the first portion 103 of the symbol 46. From the first portion 103, the microprocessor 96 identifies the appropriate polling code for the memory device 52 either using the data from the first portion 103 directly or as an address in a look-up table containing polling codes. The microprocessor 96 then determines, from the number represented by the second portion 105 of the symbol 46, the proper protocol for communicating with the memory device 52 by processing the identified number with a software program in the microprocessor 96. The use of the symbol 46 to convey the polling code and device type allows the reader 44 to read a number of different types of photonic memories 48 having differing polling codes and communications protocols, increasing the flexibility of the overall system. Where a single polling code and single protocol are used for all of the photonic memories 48, the microprocessor 96 may be preprogrammed with the appropriate polling code and protocol, and the first and second portions 103 and 105 of the symbol 46 need not be reserved to indicate the polling code and protocol.

The portion of the symbol 46 not reserved for the first and second portions 103 and 105 contains a portion of the information about the target object 40. For example, where inventory from multiple manufacturers is stored in a facility, all target objects 40 from a particular manufacturer can bear symbologies 46 identifying the manufacturer. Similarly, each item of a single inventory type can bear a symbol 46 identifying the type of inventory item. The respective photonic memory 48 can also contain additional information in an updatable form, such as inventory date and warehouse location.

In addition to optically transmitting data to the photonic memory 48 the reader 44 can also optically read the photonic memory 48. Optical reading of data is best explained with reference to FIG. 9.

As shown by the broken line arrows 106, the photonic memory 48 emits light outwardly as discussed above. The light is emitted over a sufficiently large solid angle such that it is likely to strike the reader 44. When light from the photonic memory 48 strikes the reader 44, some of the light is received by the light gathering mirror 84 and focused onto the photodetector 86. As with the light from the scanning beam, light from the photonic memory 48 is converted by the photodetector 86 into an electrical signal which is communicated to the microprocessor 96. The microprocessor 96 decodes the electrical signal to identify the data transmitted by the photonic memory 48 to the reader 44.

Because communication between the reader 44 and the photonic tag 42 is bidirectional, an appropriate communication protocol is chosen to minimize interference between the respective signals. In one embodiment, the memory device 52 utilizes a manufacturer-specified protocol in which separate, distinct polling codes are used to initiate reading, writing, and programming of commands. Other reading and writing protocols may be realized by one of skill in the art, including but not limited to data encryption such as a public key data encryption employing the Data Encryption Standard (DES).

Figure 11:
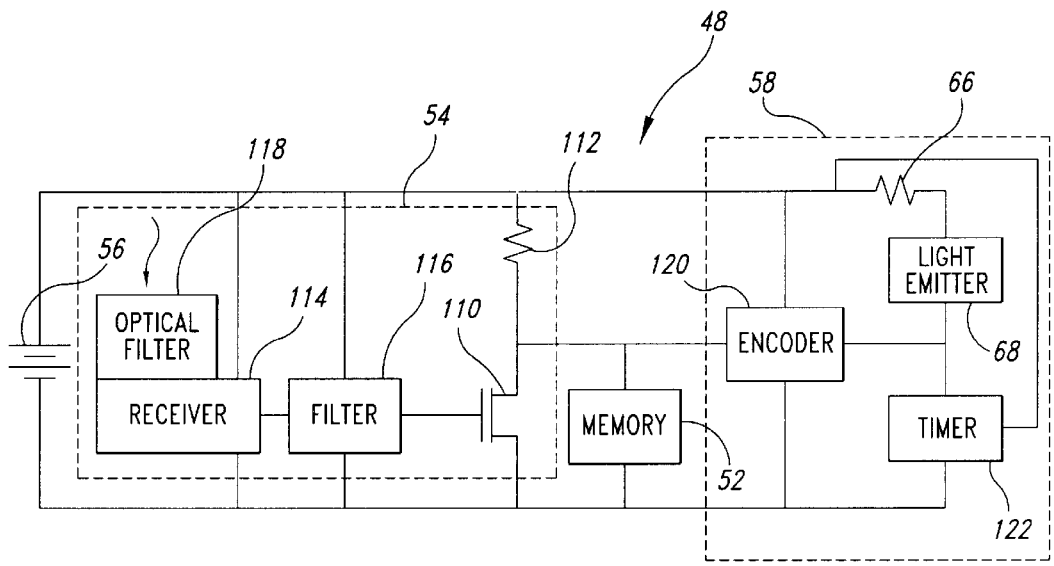
FIG. 11 is a schematic drawing of an alternative embodiment of the photonic tag incorporating an optical filter, and a timer and encoder circuit.

An alternative structure for the photonic memory 48 is presented in FIG. 11. In this embodiment, the optical detector 54 includes an optical receiver 114 which receives light through a filter 116. The receiver 114 may be a photodiode, phototransistor or other known optical detector. The filter 116 removes DC components resulting from ambient light incident upon the receiver 114, and may also serve to reduce spurious signals from the receiver 114. The filter 116 is preferably a passive, band pass filter, though an active filter and/or high-pass filter may be used depending upon the power consumption and frequency limitations of the memory device 52 and the reader 44. To further minimize the effects of ambient light, an optical filter 118 overlays the receiver 114. The optical filter 118 is a wavelength selective filter that preferentially passes light at the wavelength of the laser diode 74 (FIG. 9) and blocks light at other wavelengths.

When modulated light from the reader 44 strikes the optical filter 118, the optical filter 118 transmits the light to the receiver 114. The receiver 114, in response to the light transmitted by the optical filter 118, produces an electrical signal which is input to the filter 116. The filter 116 removes undesirable electrical components from the signal. The output from the filter 116 is used to drive the gate of a MOS transistor 110 biased through a bias resistor 112 connected to the source of the transistor 110. In response to the output from the filter 116, an output voltage is produced at the source of the transistor 110 corresponding to the modulation of the optical signal from the reader 44. The output signal from the source of the transistor 110 is coupled to the memory device 52 to write to the memory device 52 or activate the memory device for reading as described above.

As with the embodiment of FIG. 8, the photonic memory 48 in the embodiment of FIG. 11 emits light with the optical emitter 58. As above, the optical emitter 58 includes the LED 68 and the current limiting resistor 66 serially connected to the power source 56. To reduce power consumption by the LED 68, the optical emitter 58 also includes an encoder 120 coupled between the memory device 52 and the LED 68 and a timer 122 coupled between the LED and the negative terminal of the power source 56.

Figure 13:
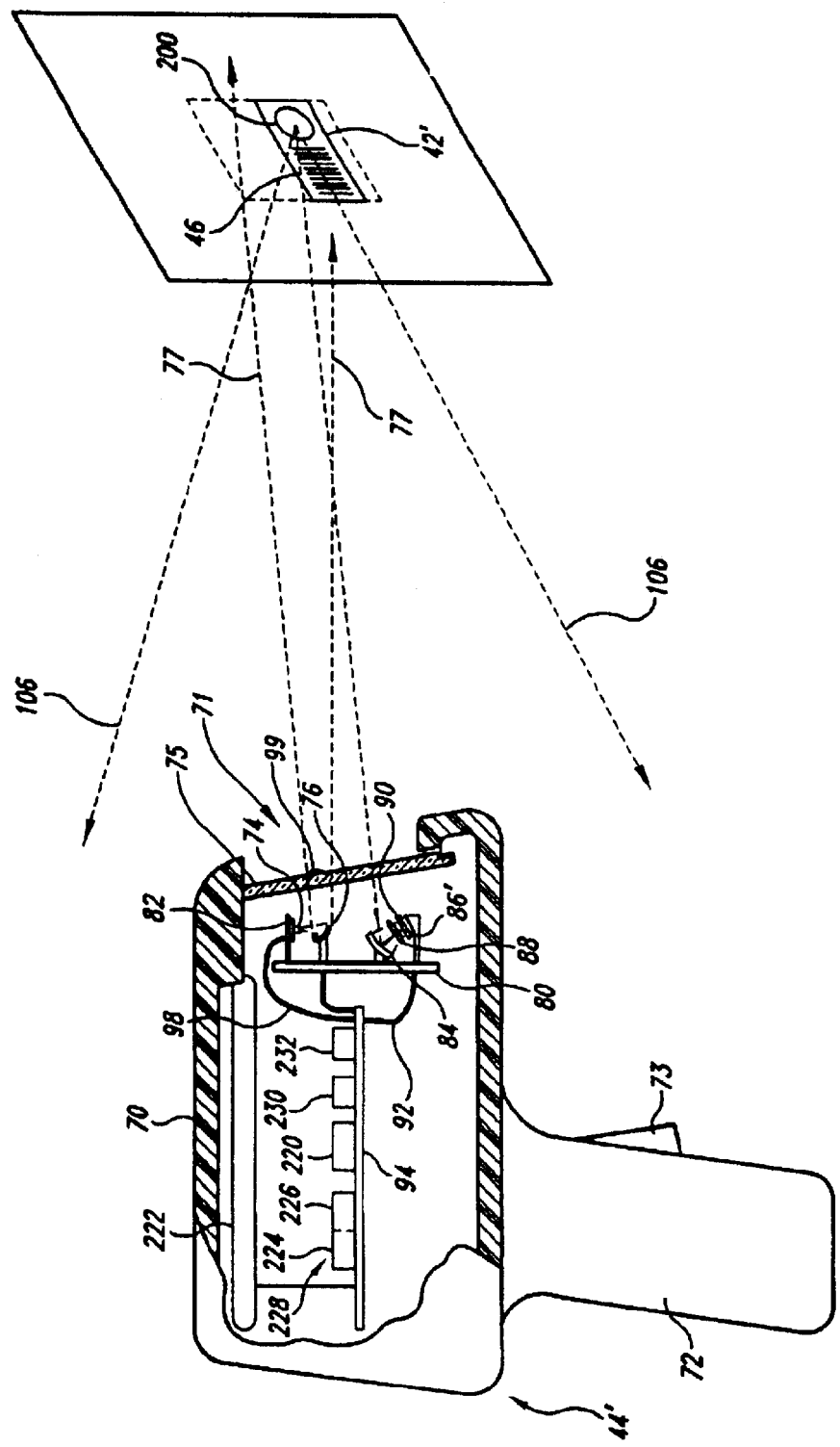
FIG. 13 is a side cross-sectional view of a data reader having an RF section, and an RF memory tag according to a second exemplary embodiment of the present invention.

In operation, the encoder 120 accepts and holds data from the memory device 52 for use in driving the LED 68. The timer 122 produces clock pulses to activate the encoder 120. In response to the pulses from the timer 122, the encoder 120 draws current through the LED 68 in a sequence corresponding to the data retrieved from the memory device 52. In response to the current drawn by the encoder 120, the LED 68 emits light for detection by the reader 44 (FIG. 13). Because the encoder 120 controls light emission from the LED 68 in response to the timer 122, the frequency and duration of the data signal from the LED 68 can be varied to reduce power consumption. Also, the optical signal corresponding to the data retrieved from the memory device 52 may be repeated several times to reduce data loss.

Figure 9:
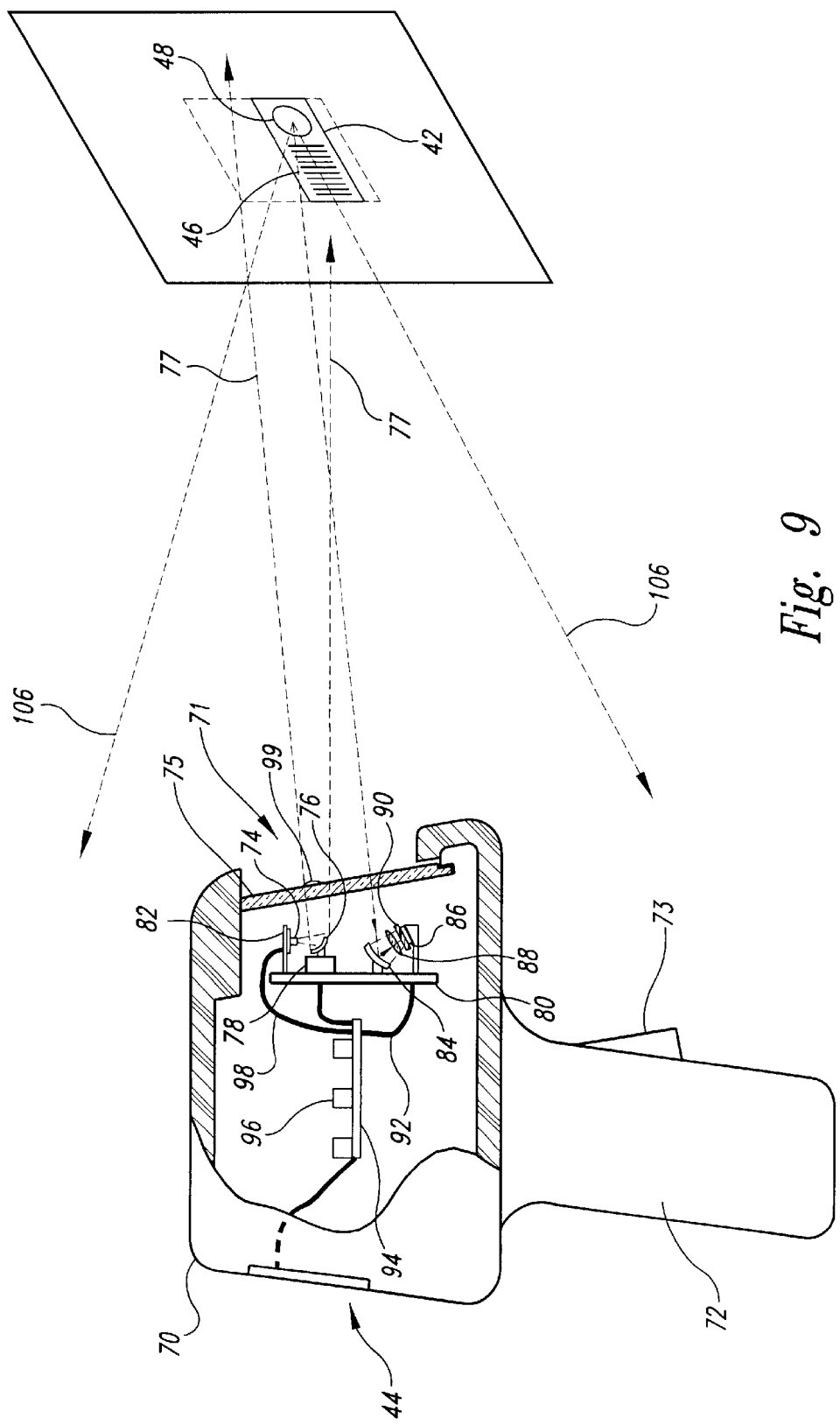
FIG. 9 is a side cross-sectional view of a data reader and a photonic tag according to the first exemplary embodiment of the present invention showing bidirectional optical communication.

The second exemplary embodiment will be discussed with reference to FIGS. 8–10, wherein the memory tags are formed as RF tags 42'. The preferred embodiment of the RF tag 42' is shown in FIG. 13 as having two primary components, a symbol 46 and an RF memory 200, both carried by a substrate 50. As was the case for the photonic tags 42, the substrate 50 is a substantially planar platform upon which the symbol 46 is printed and to which the RF memory 200 is attached. The substrate 50 is adapted for repeated attachment to various target objects 40.

Figure 12:
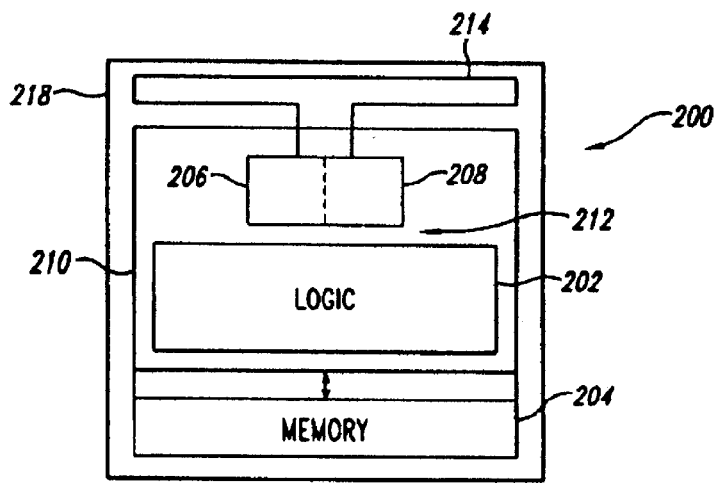
FIG. 12 is a block diagram of an RF memory of an RF tag.

A passive RF memory 200 is shown in block diagram form in FIG. 12. The RF memory 200 includes a logic 202 and a memory 204, an RF detector 206, and an RF emitter 208 all coupled by the logic 202. In the preferred embodiment, the RF detector 206 and the RF emitter 208 are integrally formed in an integrated circuit 210 as an RF transceiver 212 which is coupled to a common antenna 214. Alternatively, the RF detector may be provided as an RF receiver coupled to an antenna, while the RF emitter may be provided as an RF transmitter coupled to a separate antenna (not shown).

The integrated circuit 210 may include an analog circuit comprising the RF transceiver 212, and a digital circuit comprising the logic 202 and the memory 204. The logic 202 may be provided in the form of microcode or as a hardwired circuit. The RF detector 206 is used to convert an RF signal received from the antenna 214 to a DC voltage which powers up the logic 202 and transmits information and commands for storing and retrieving data from the memory 204. The digital circuit generally executes all of the functions performed by the RF memory 200, such as retrieving stored data from the memory 204 and modulating the RF signal to transmit the retrieved data. A protective housing 218 encloses the components. While the RF tag 42' shown is a passive device, a self-powered active device may be employed. The logic 202, in the form of a microprocessor or microcontroller, controls data transfer and electrical operation of the RF memory 200 in a manner known in the art using a manufacture-identified protocol.

Communication to and from the RF tag 42' is realized with the reader 44'. The structure and operation of the reader 44' of the second exemplary embodiment will now be described with reference to FIG. 13.

Figure 14:
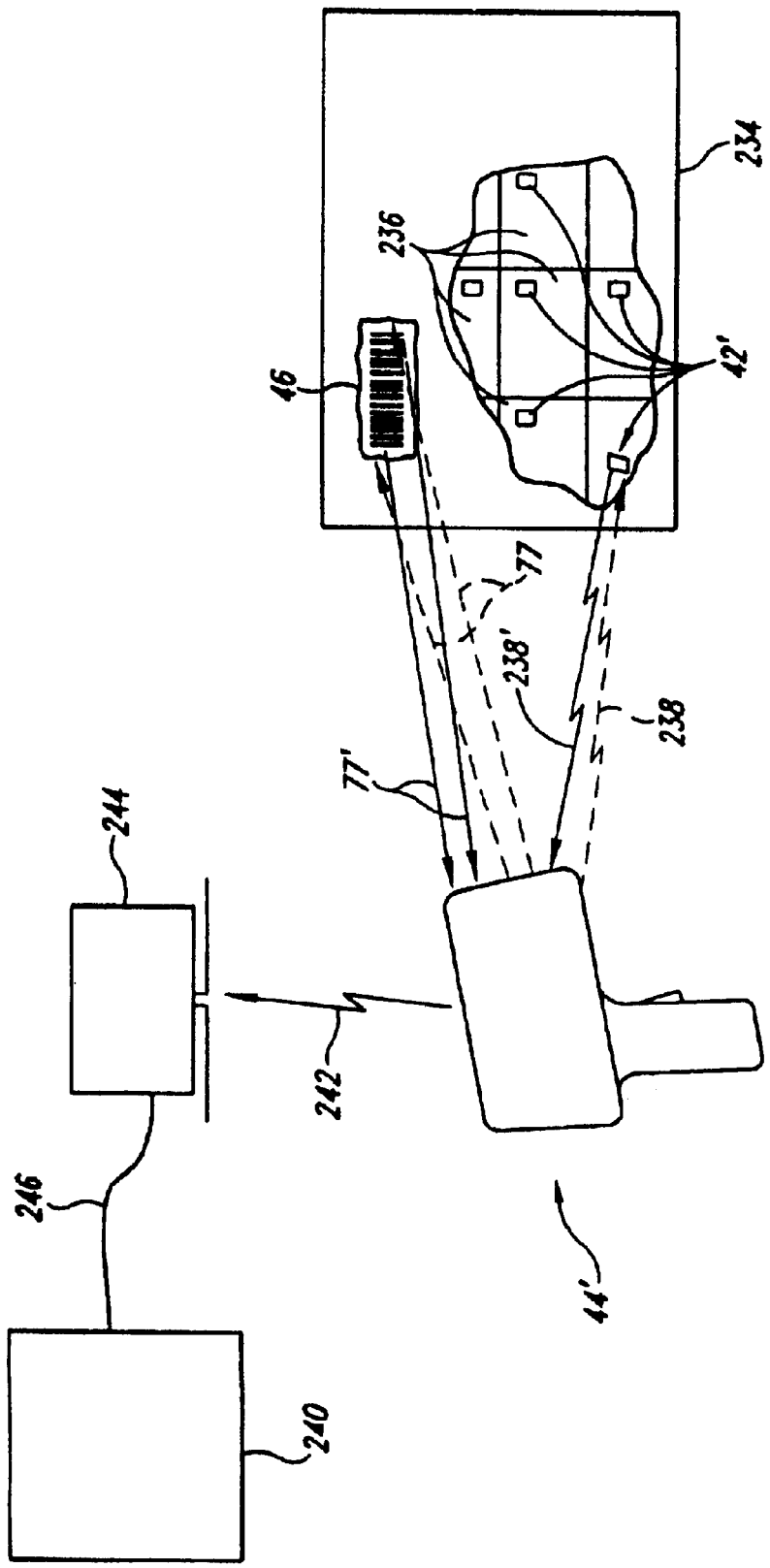
FIG. 14 is an isometric view of the reader of FIG. 13 used to take inventory of the contents of a container and to relay the inventory to an external system.

The RF tag reader 44' includes a symbol reader section for reading the symbol 46 on the RF tag 42'. In the second exemplary embodiment, the symbol 46 is read in much the same manner as in the first exemplary embodiment, although an alternative structure will be disclosed for the symbol reader section. The user orients the reader 44' with the reading face 71 thereof facing the RF tag 42'. The user then actuates the trigger 73 to initiate reading. The reader 44' reads the symbol 46 in a conventional manner by illuminating the symbol 46 with a beam, shown by broken line arrows 77, and detecting the reflected pattern of light energy from the symbol 46, shown as broken line arrows 77' (FIG. 14).

The reader produces the illuminating beam with one ore more laser diodes 74. The illuminating beam is directed out of the reader, often with the assistance of mirrors 76 and lens 99. While a scanning mirror and scanning motor similar to that of the first exemplary embodiment could be employed, the second exemplary embodiment instead employs a fixed illumination beam and electronic means for scanning the returned beam. The laser diodes 74 are oriented to emit a beam of light out the window 75 in the head 70 of the reader. The structure and operation of such combinations for scanning symbols is known in the art.

As the illumination beam exits the reader through the window 75, it travels to the target, one of the RF tags 42', and strikes the symbol 46. Because the symbol 46 is a pattern of varying reflectances, some of the light is reflected back to the reader in a pattern corresponding to the pattern of the symbol 46. The light reflected from the symbol 46 enters the head 70 through the window 75 and strikes a gathering mirror 84 which gathers the reflected light and directs it toward a photodetector 86'. A lens 88 may focus the light reflected from the gathering mirror 84 onto the photodetector 86'. To reduce the sensitivity of the photodetector 86' to ambient light, a wavelength selective optical filter 90 may be placed between the lens 88 and the photodetector 86'.

In the second exemplary embodiment, the photodetector 86' takes the form of a linear array of photosensitive elements, preferably a charged coupled device ("CCD") having, for example, linear active surface pixel elements. Other known imagers may be used, such as vidicons, two-dimensional semiconductor arrays, or a two-dimensional CCD array. Additionally, other size CCD arrays may be used, for example, circular or square CCD arrays. The pixel element array defines a field of view of the reader head 70.

As is known, each pixel element in the linear CCD array 86' outputs a gray level signal, i.e., an analog signal that determines the amount of intensity of light impinging upon the particular pixel element. Alternatively, each pixel element in the linear CCD array 86' can output the signal that indicates the gray intensity value of the particular pixel element. In an exemplary embodiment, each pixel element has an intensity value ranging between 0 and 15, or 0 and 255, ranging between black and white. The signals output from the linear CCD array 86' are similar to video data.

While the exemplary embodiment of the photodetector 86' is of a linear imager, those skilled in the relevant art will readily recognize that other image digitizing or capture devices can be employed, including color sensitive equipment. Electronic means may be employed to selectively sample each of the pixel elements of the photodetector 86' to effectively scan the symbol 46. This eliminates the need for a scanning illumination beam, and the equipment to produce such a scanning illumination beam. Thus, the symbol reader section may be significantly simplified by reducing the number of moving parts.

The photodetector 86' converts the reflected light into an electrical signal which is communicated to a printed circuit board 94 carrying a microprocessor 220. The microprocessor 220 receives the electrical signal from the photodetector 86' and decodes the electrical signal to identify the information represented by the symbol 46.

As discussed in reference to the first exemplary embodiment, the data encoded in the symbol 46 includes a key which is logically associated with a code for activating and operating the respective RF tag 42'.

In the second exemplary embodiment, the reader 44 also includes an RF section for communicating with the RF memory 200 of the RF tag 42' and for defining an RF tag reader 44'. The RF tag reader 44' includes an antenna 222 which is coupled to a transmitter 224. In this embodiment, the transmitter 224 includes a receiver 226 to form a radio frequency transceiver 228, although the transmitter and receiver could be provided as separate components, each coupled to a respective antenna. The microprocessor 220 is coupled to the transceiver 228 for controlling the operation of the transmitter 224 and receiver 226, as well as for receiving the data signal received by the receiver 226 portion of the transceiver 228. A memory in the form of a read only memory (ROM) 230 is coupled to the microprocessor 220 for storing programs and data for the microprocessor 220 to execute. A memory in the form of a random access memory (RAM) 232 is also coupled to the microprocessor 220 for providing storage for data received by the receiver 226 and decoded by the microprocessor 220. Power for these components may be supplied via a power bus (not shown), from an external power supply, or from an internal power supply, such as a set of batteries (not shown).

With reference to FIG. 14, the RF tag reader 44' is shown for performing inventory data collection by retrieving data encoded in a data encoding article, such as the RF tag 42' located, for example, in a carton, box or container 234. The reader illuminates a symbol 46 located on the exterior of the container 234 with a beam, shown by the broken arrows 77. The symbol 46 may encode keys or data identifying for each of a number of items 236 that are supposed to be in the container 234. Alternatively, a separate symbol (not shown) may be provided for each of the items that is supposed to be in the container 234.

The photodetector 86' (FIG. 13) of the reader 44' detects the returned beam, shown by the solid arrows 77', and converts the returned beam into electrical signals. The microprocessor 220 (FIG. 13) converts the electrical signals into a series of keys, each key related to a one of the plurality of items 236 that are supposed to be stored in the container 234. The RF tag reader 44' generates an interrogation signal in a form of a radio frequency transmission, shown as broken zigzag line 238. The interrogation signal is modulated to encode a polling code therein for corresponding to a particular RF tag 42', or for avoiding confusion with stray RF emissions.

Upon receipt of the interrogation signal, the RF tag 42' samples or examines the polling code. If the polling code corresponds to the particular RF tag 42', then the RF memory 200 (FIG. 13) generates and transmits a data beam 238', in the form of a radio frequency transmission, shown as solid zigzag line 238', which is modulated to transmit the data or information contained in the RF tag's memory 204 (FIG. 12). Upon receipt of the data beam 238', the receiver 226 (FIG. 13) converts the data beam 238' into a series of electrical signals. The microprocessor 220 (FIG. 13) converts the electrical signals generated by the receiver 226 into data, which is stored in the RF tag's reader's memory 230 (FIG. 13). In this way, it may be determined whether the closed or sealed container 234 actually contains each item 236 that it is supposed to contain, as identified by the symbol 46 carried on the side of the container 234. Thus large containers holding a large number of items may be quickly and accurately inventoried without having to break any security seals, or without having to actually handle each item.

As the occasion arises, or whenever the memory 230 becomes full, the user may download the data stored in the memory 230 to an external device, such as a computer network 240. The user may do so by operating the trigger 73 on the RF tag reader 44'. The microprocessor 220 will retrieve the data stored in the memory 230, and cause the transmitter 224 and antenna 222 to generate a communication signal 242. The communication signal 242 again takes the form of a modulated radio frequency transmission. The communication beam 242 is received by a receiver and antenna combination 244, which converts the communication signal 242 to data for delivery to the computer network 240, for example over a transmission line 246. Different identification data, such as the polling signal, may be encoded in each of the interrogation signal 238, the data signal 238' and the communication signal 242 to prevent one transmission from being mistaken for the other transmission.

Figure 15:
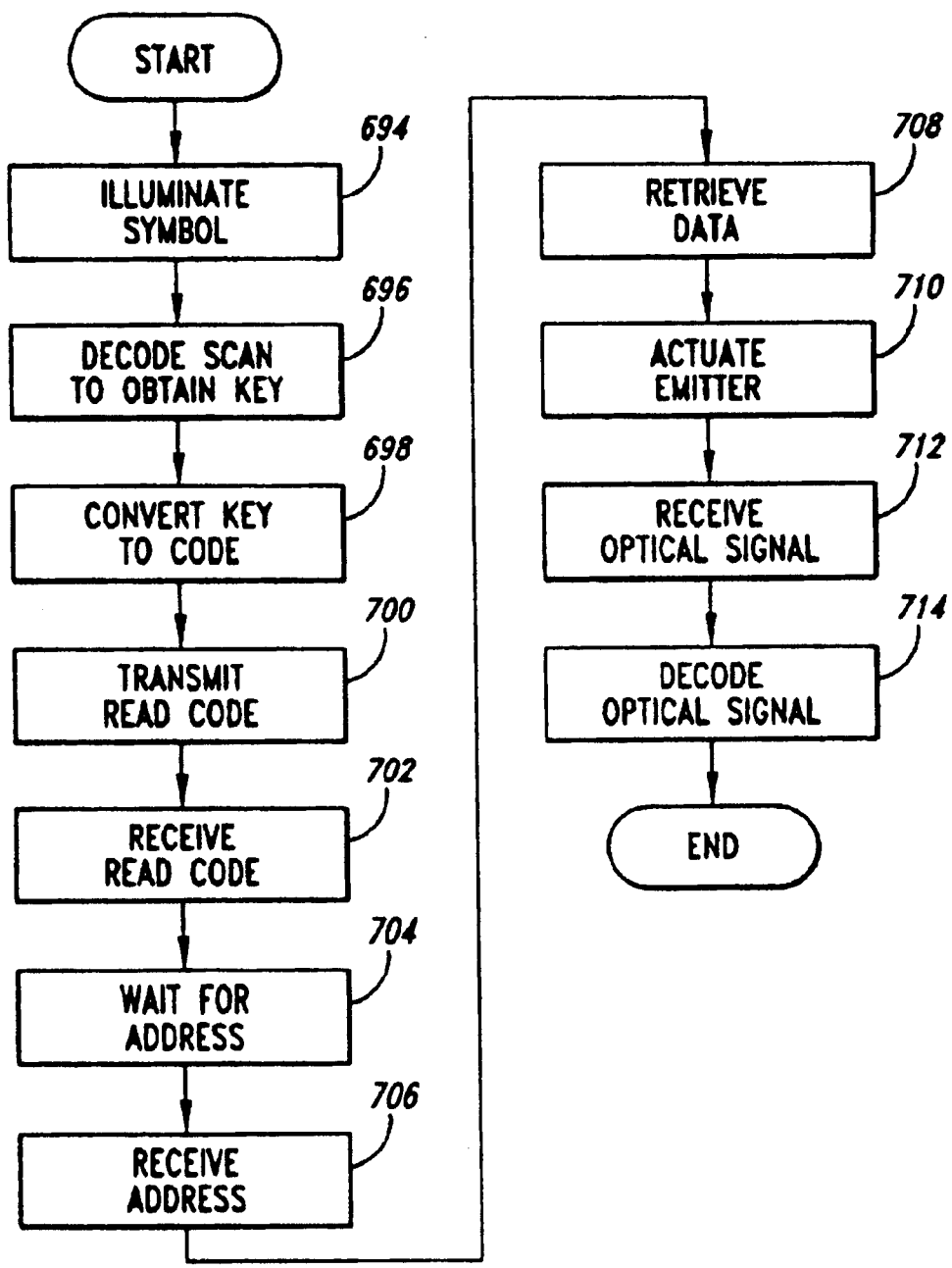
FIG. 15 is a flowchart showing the steps for reading data from the photonic tag.

The steps for reading data from the memory tag 42, 42' are represented by the flowchart of FIG. 15. In step 694, the reader 44, 44' illuminates the symbol 46 associated with the memory tag 42, 42' with a beam of light. The beam of light is modulated by the varying reflectances of the symbol 46 and is reflected back to the reader 44, 44'. Upon receipt of the returned light by the photodetector 86, 86', the microprocessor 96, 220 in step 696, interprets the returned beam to identify a key encoded in the symbol 46. In step 698, the microprocessor 96, 220 can obtain a polling code from, for example, the memory 232 based on the key. The reader 44, 44' in step 700 transmits the polling code corresponding to reading data as discussed above. Upon receiving a polling code indicating reading in step 702, the memory device 52, 204 awaits a memory address in step 704. Upon receiving the memory address from the reader 44, 44' in step 706, the memory device 52, 204 in step 708 retrieves data from the received memory address and in step 710 activates the emitter 58, 208 to emit a data signal representing the retrieved data. In step 712, the reader 44, 44' receives the data signal and, in step 714, decodes the data signal to identify the data retrieved from the location indicated by the memory address.

Figure 16:
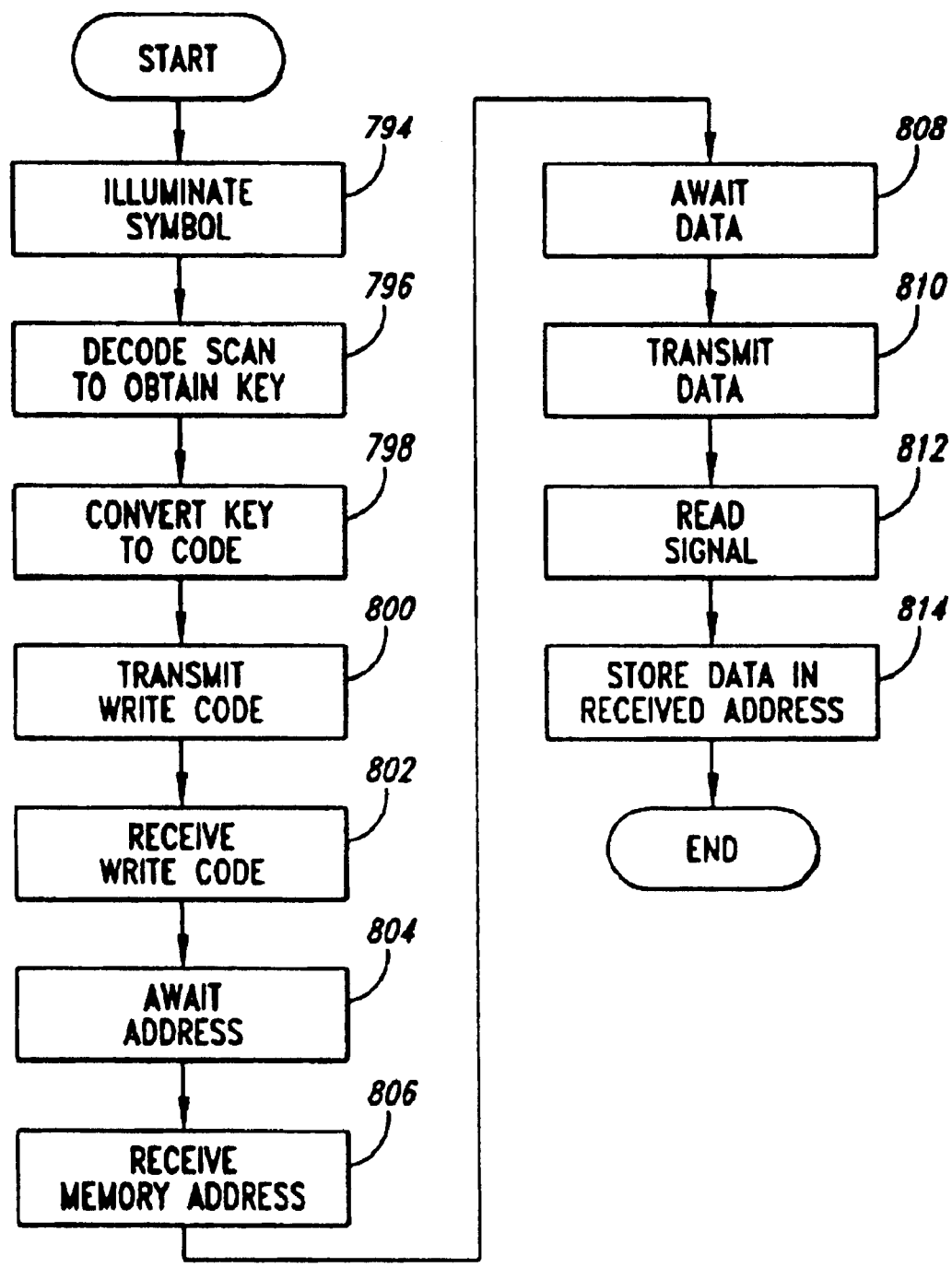
FIG. 16 is a flowchart showing the steps for writing data to the photonic tag.

The steps for writing data to the memory tag 44, 44' are represented by the flowchart of FIG. 16. In step 794, the reader 44, 44' illuminates the symbol 46 associated with the memory tag 42, 42' with a beam of light. The beam of light is modulated by the varying reflectances of the symbol 46 and is reflected back to the reader 44, 44'. Upon receipt of the returned light by the photodetector 86, 86', the microprocessor 96, 220 in step 796, interprets the returned beam to identify a key encoded in the symbol 46. In step 798, the microprocessor 96, 220 can obtain a polling code from, for example, the memory 232 based on the key. The reader 44, 44' initiates writing in step 800 by transmitting a polling code corresponding to writing to the memory device 52. The polling code is received by the memory device 52 in step 802. When the memory device 52 determines that the polling code from the reader 44 represents a write data command, the memory device 52 awaits a memory address from the reader 44 in step 804. Upon receiving the memory address in step 806, the memory device 52 awaits data from the reader 44 in step 808. The reader 44 then transmits the data via the modulated data signal in step 810. The detector 54 detects the signal in step 812 and the data is stored in a location corresponding to the memory address in step 814.

Programming the memory tag 42, 42' follows substantially the same steps as those described above for writing data to the memory device, except that the polling code is selected to direct the memory device 52, 204 to accept commands instead of data. The commands are then entered according to the programming protocol specified by the manufacturer.

Figures 17, 19:
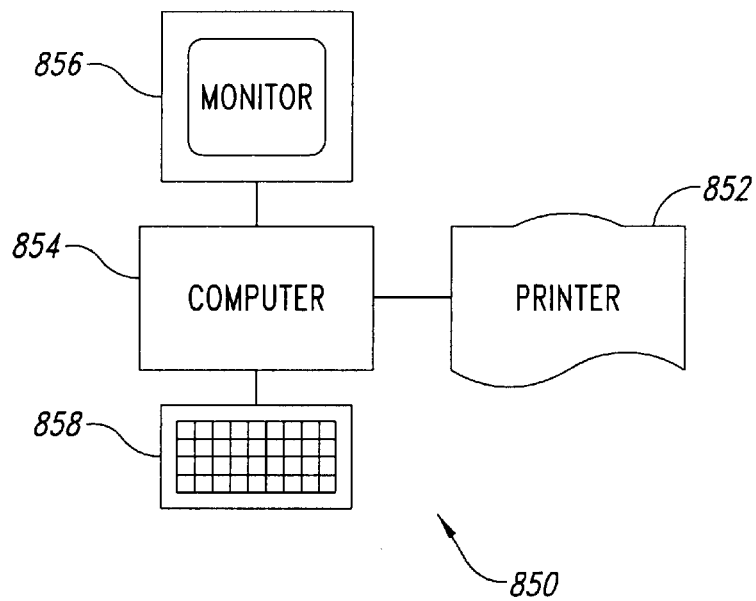
FIG. 17 is a block diagram of a printer system for printing or producing tags under an embodiment of the present invention.
FIG. 19 is an exemplary reference table employed by the routine of FIG. 18.

Referring to FIG. 17, a printer system 850 is shown for printing tags, such as the memory tag 42. The printer system 850 includes a printer 852 that prints the symbol 46, and can interrogate and program the photonic memory 48 or RF memory 200. The printer 852 may include not only a print engine for printing marks on a tag or label, but also include electronics similar to those in the reader 44, especially electronics for interrogating the memory of a tag (optical and/or RF tags). The memory tags 42 formed as individual preformed discrete sections of the substrate 50, where each section includes one of the photonic memories 48 or RF memories 200 secured thereto. Alternatively, the printer 852 can employ a continuous sheet of the substrate 50 having selectively spaced photonic memories 48 secured thereto.

An optional computer 854 can interface with the printer 852, to exchange data therebetween. The computer 854 includes standard components, such as memory, one or more mass storage devices, and one or more processors. The computer 854 is coupled to a visual display device, such as monitor 856, and one or more input devices, such as a keyboard 858. Other input devices can also be coupled to the computer 854, such as mice, scanners, pen and tablets, as well as machine-readable symbol input devices, such as laser scanners, two-dimensional images, etc.

Figure 18:
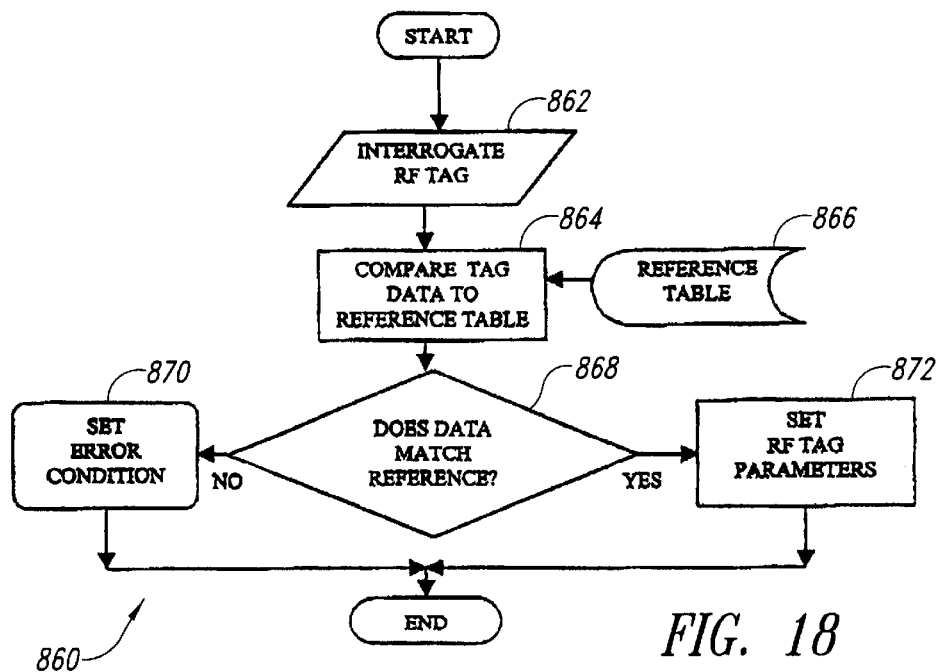
FIG. 18 is a flowchart of a routine for interpreting characteristics of data interrogated from a tag.

The printer system 850, as well as the readers 44 and 44', can interrogate the memory of a tag and set parameters based on characteristics of a data stream received from the tag. For example, referring to FIG. 18, the reader 44' under a routine 860 initially interrogates a tag in step 862. While the routine 860 is described below with respect to the reader 44, a similar routine can be performed by the reader 44' for photonic memories or by the printer system 850. In step 864, the reader 44' compares data received from the tag to a look-up reference table 866.

Referring to FIG. 19, an exemplary reference table 866 includes numerous read data entries and corresponding effects in the reader 44' based on the read data. As noted above, the memory 204 stores numerous fields, including a header field, an address field, and other fields, in addition to data stored therein. Referring to FIG. 19, the header can represent not only the beginning of the data in the memory 204, but also identify a particular characteristic for the RF memory 200, such as whether the memory 200 is a read and write tag, or a read only tag.

Referring back to FIG. 18, the reader 44' in step 868 determines whether the data read from the tag matches any of the read data fields in the reference table 866. If the read data does not match any of the fields in the reference table 866, then in step 870, the reader 44' sets an error condition, and the routine 860 ends. However, if the read data matches a field in the reference table 866, then the reader 44' sets one or more parameters in the reader under step 872. For example, if the header data indicates that the tag is a read only tag (i.e., the interrogated data corresponds to "Header B" data), then the reader 44' determines that it cannot write to the tag, and therefore does not perform any writing functions thereto.

Of course, other data interrogated from the RF memory 200 can have different effects. For example, the printer 852 could interrogate each RF memory 200 before printing a bar code symbol on the substrate 50. Each RF memory 200 in a spool or stack or tags to be printed by the printer 852 may include a unique tag address that uniquely identifies each of the. RF memories. The printer 852 can interrogate each RF memory 200 before printing the corresponding bar code symbol to augment data to be printed in the symbol. If the address of the RF memory 200 has a predetermined value in the reference table 866 (e.g., its two most significant bytes correspond to "Address A"), then the printer 852 prints predetermined data in a first field of the corresponding bar code symbol (shown as "Print X Data in Field 1" in FIG. 19). Likewise, if the printer 852 reads another address ("Address B") then the printer 852 prints data ("Print Y Data in Field 2").

In another example, the reader 44' can determine tag residence time at the interrogator location based on a particular frequency for the RF memory 200. For example, if the reader 44' senses a predetermined frequency ("Frequency A") as the carrier frequency for the RF memory 200, then the reader in step 872 determines how long to interrogate the RF memory in order to extract all data from the memory 204. Another frequency ("Frequency B") could cause the reader 44' to interrogate another tag for a different duration ("For Tag Residence Time to Q").

Examples of other effects of interrogated data stored in the reference table 866 include determining a type or level of encryption of data stored in the RF memory 200, and possibly retrieval of the appropriate key to decrypt the data. As noted above, the reader 44' can initially read the symbol 46 (FIG. 17) to extract certain data or configure the reader before interrogating the RF memory 200. As a result, the reader 44' requires a reduced handshake with the RF memory 200, thereby reducing the tag residence time at each interrogator location. Overall, such a technique of employing characteristics of the data stream and individual field and bytes therein from data interrogated from the RF memory 200 may be used with the reference table 866 (or other means including algorithmically) to more efficiently set parameters in the reader and exchange data therebetween.

Figure 20:
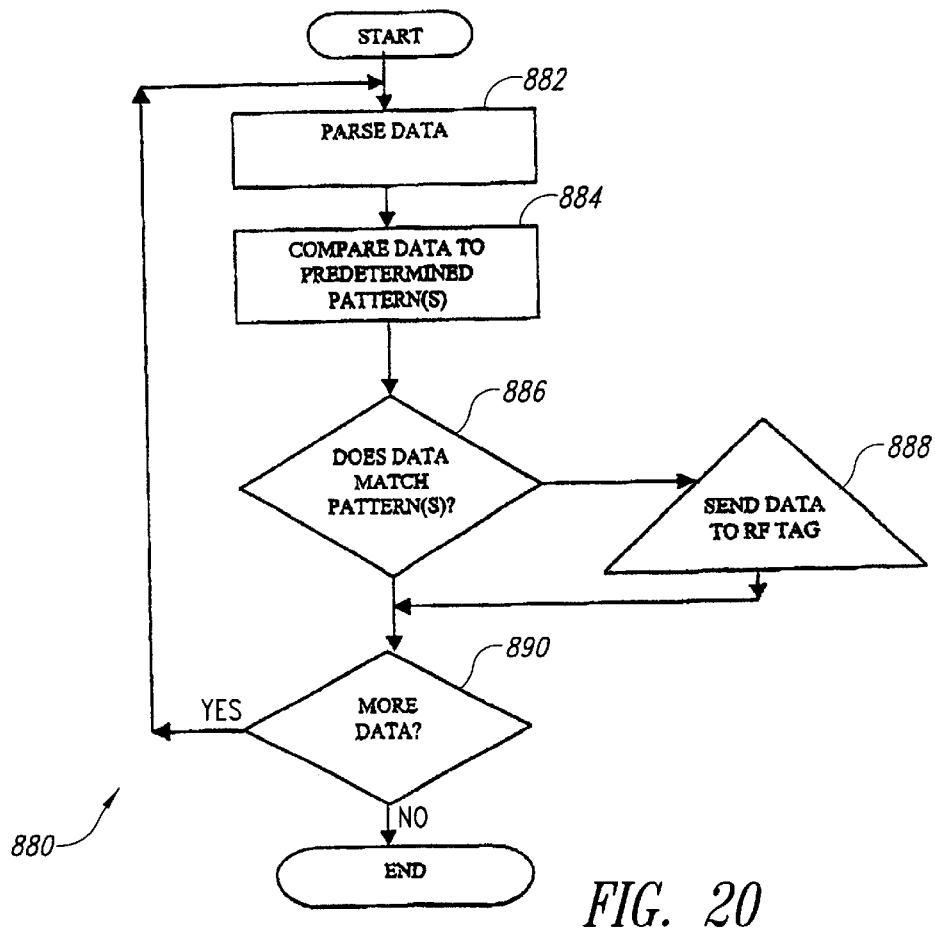
FIG. 20 is a flowchart diagram of a routine for examining and handling characteristics of data for storage in a tag.

Referring to FIG. 20, characteristics of data can be used more effectively by a reader or printer for writing data to the RF memory 200. Under an exemplary routine 880, the printer 852 in step 882 parses an incoming data stream into individual bytes or fields. In step 884, the printer 852 compares a field or other parsed data to predetermined patterns. For example, the printer 852 compares the parsed data to a reference table such as the reference table 866. In step 886, the printer 852 determines whether the data matches any of the predetermined patterns. For example, an incoming data stream to the printer 852 may be selected to be printed in the bar code symbol. The printer 852, however, in step 886 may determine that a particular field in the bar code data should also be written to the RF memory 200. Therefore, in step 888, the printer 852 sends a copy of the field to be written to the RF member 200, in addition to be printed in a field of the bar code symbol. For example, the printer 852 may determine that if data in a particular field is to be printed in a bar code field and the data identifier (i.e., the first few characters of the data) is of a predetermined type (or conversely, not a predetermined type), then the data is copied to the memory 204 of the RF memory 200. In step 890, the printer 852 determines whether there is more data. If so, then the routine 880 loops back to step 882. If not, the routine ends.

Under the routine of 880, an existing bar code printer can be readily retrofitted with appropriate RF read/write electronics to permit the printer to print bar code symbols, and to copy relevant data in the bar code symbols to memories of the RF memory tags.

Although specific embodiments of, and examples for, the present invention are described herein for illustrative purposes, various equivalent modifications can be made without departing from the spirit and scope of the invention, as will be recognized by those skilled in the relevant art. The teachings provided herein of the present invention can be applied to other readers and memory devices, not necessarily the optical and RF readers generally described above.

For example, the memory tag 42 may have an optical detector and an RF emitter, or conversely, the memory tag 42 may have an RF detector and an optical emitter. Similarly, one skilled in the art will recognize that various circuit structures may be employed in the memory tag 42, 42' and tag reader 44, 44' depending upon the desired operational parameters. Also, by simply omitting the optical emitter 58, the photonic tag may be used as an optically writable memory.

Additionally, the invention may employ other machine readable symbols such as area or 2-D symbols, not just the exemplary linear bar code symbol described above. The machine readable symbol may encode data in addition to, or as a substitute for, the key discussed above. These and other changes can be made to the invention in light of the above-detailed description. In general, in the following claims, the terms used should not be construed to limit the invention to the specific embodiments disclosed in the specification and the claims, but should be construed to include all memory tag and machine readable symbol combinations that operate in accordance with the claims to provide a means or methods for communicating with the memory of the memory tag. Accordingly, the invention is not limited by the disclosure, but instead its scope is to be determined entirely by the following claims.

What is claimed is:

1. A system for producing an information storage device having a substrate, comprising:

a print engine for printing marks on the substrate;

a transmitter that transmits an information signal for storage in the information storage device;

a memory having a reference table stored therein; and a controller coupled to the print engine and the transmitter, wherein the controller compares at least a portion of the information signal to the reference table, and if the portion of the information signal matches an entry in the reference table, then the controller adjusts operation of the print engine or the transmitter, and wherein the controller determines whether the information storage device is a read-only information storage device, and disables the transmitter from transmitting the information signal.

2. A system for producing an information storage device having a substrate, comprising:

a print engine for printing marks on the substrate;

a transmitter that transmits an information signal for storage in the information storage device;

a memory having a reference table stored therein;

a receiver that receives a carrier signal from the information storage device; and a controller coupled to the print engine and the transmitter, wherein the controller compares at least a portion of the information signal to the reference table, and if the portion of the information signal matches an entry in the reference table, then the controller adjusts operation of the print engine or the transmitter, and wherein the controller identifies a transmit time for the transmitter if the carrier signal matches an entry in the reference table.

3. A system for producing an information storage device having a substrate, comprising:

a print engine for printing marks on the substrate;

a transmitter that transmits an information signal for storage in the information storage device;

a memory having a reference table stored therein; and a controller coupled to the print engine and the transmitter, wherein the controller compares at least a portion of the information signal to the reference table, and if the portion of the information signal matches an entry in the reference table, then the controller adjusts operation of the print engine or the transmitter, and wherein the controller retrieves a key from the reference table if a portion of the information signal matches an entry in the reference table, and decrypts another portion of the information signal using the key.

4. A system for producing an information storage device having a substrate, comprising:

a print engine for printing marks on the substrate;

a transmitter that transmits an information signal for storage in the information storage device wherein the transmitter is a photonic transmitter;

a memory having a reference table stored therein; and a controller coupled to the print engine and the transmitter, wherein the controller compares at least a portion of the information signal to the reference table, and if the portion of the information signal matches an entry in the reference table, then the controller adjusts operation of the print engine or the transmitter, and the information storage device includes a photonic memory.

5. A method of retrieving data from a data storing device having a memory, a detector and an emitter, the method comprising:

accessing an information signal stored in the memory of the data storing device;

wherein determining includes determining whether the information storing device is a read-only information storing device, and disabling the transmitter from transmitting the information signal;

determining if a portion of the accessed information signal matches to a reference table; and configuring an apparatus if the portion of the accessed information signal matches to an entry in the reference table.

6. A method of retrieving data from a data storing device having a memory, a detector and an emitter, the method comprising:

accessing an information signal stored in the memory of the data storing device;

determining if a portion of the accessed information signal matches to a reference table;

receiving a carrier signal from the information storing device;

identifying a transmit time if the carrier signal matches an entry in the reference table; and configuring an apparatus if the portion of the accessed information signal matches to an entry in the reference table.

7. A method of retrieving data from a data storing device having a memory, a detector and an emitter, the method comprising:

accessing an information signal stored in the memory of the data storing device;

determining if a portion of the accessed information signal matches to a reference table;

retrieving a key from the reference table if a portion of the accessed information signal matches an entry in the reference table;

decrypting another portion of the accessed information signal using the key; and configuring an apparatus if the portion of the accessed information signal matches to an entry in the reference table.

8. A method of storing data in a data storing device having a memory, a detector and an emitter, the method comprising:

receiving an information signal;

comparing at least a first portion of the information signal to a reference table;

storing at least a second portion of the information signal in the memory; and if the portion of the information signal matches an entry in the reference table, then adjusting the storing of the second portion of the information signal in the memory wherein adjusting the storing of the second portion of the information signal includes copying the second portion of the information signal, and printing a machine-readable symbol having encoded therein the second portion of the information signal.

9. A method of storing data in a data storing device having a memory, a detector and an emitter, the method comprising:

receiving an information signal wherein receiving an information signal includes receiving the first portion of the information signal from data encoded in the machine-readable symbol indicating that the data storing device includes encrypted information;

comparing at least a first portion of the information signal to a reference table;

storing at least a second portion of the information signal in the memory; and if the portion of the information signal matches an entry in the reference table, then adjusting the storing of the second portion of the information signal in the memory wherein adjusting the storing of the second portion of the information signal includes encrypting the second portion of the information signal.

10. A system for producing an information storage device having a substrate, comprising:

a housing;

a print engine received by the housing and configured to print marks on the substrate;

a wireless memory transmitter received by the housing wherein the transmitter is a photonic transmitter and is configured to transmit an information signal for storage in the information storage device; and at least one controller and a memory received by the housing and coupled to the print engine and the transmitter, wherein the controller is programmed to control the print engine to print a bar code symbol on the substrate, and is programmed to control the transmitter to transmit the information signal to the information storage device for storage therein, and the information storage device includes a photonic memory.

11. A printer system for use with wireless memory tags, comprising:

a housing;

a print engine received by the housing and configured to print machine-readable symbols;

a wireless tag data receiver received by the housing and configured to wirelessly receive an information signal from a wireless memory tag wherein the wireless tag data receiver is a photonic receiver; and at least one controller received by the housing and coupled to the print engine and the wireless tag data receiver, wherein the controller is programmed to control the print engine to print a machine-readable symbol on the wireless memory tag, and is programmed to receive the information signal from the wireless memory tag.

12. A printer for use with memory tags, comprising:

a print engine configured to print machine-readable symbols;

a tag data receiver configured to receive an information signal from a memory tag wherein the tag data receiver is a photonic receiver; and at least one controller coupled to the print engine and the tag data receiver, wherein the controller is programmed to control the print engine to print a machine-readable symbol on a memory tag, and is programmed to receive the information signal from the memory tag.

* * * * *